(12) United States Patent
McElroy et al.

(10) Patent No.: US 6,821,663 B2
(45) Date of Patent: Nov. 23, 2004

(54) SOLID OXIDE REGENERATIVE FUEL CELL

(75) Inventors: James McElroy, Suffield, CT (US); Matthias Gottmann, Sunnyvale, CA (US); John Finn, Mountain View, CA (US); Fred Mitlitsky, Livermore, CA (US)

(73) Assignee: Ion America Corporation, Moffett Field, CA (US)

( * ) Notice: Subject to any disclaimer, the term of this patent is extended or adjusted under 35 U.S.C. 154(b) by 40 days.

(21) Appl. No.: 10/635,446

(22) Filed: Aug. 7, 2003

(65) Prior Publication Data

US 2004/0081859 A1 Apr. 29, 2004

Related U.S. Application Data

(60) Provisional application No. 60/420,259, filed on Oct. 23, 2002.

(51) Int. Cl.[7] .............................................. H01M 8/04
(52) U.S. Cl. ........................... 429/17; 429/19; 429/20; 429/26
(58) Field of Search ............................ 429/17, 20, 26, 429/19

(56) References Cited

U.S. PATENT DOCUMENTS

| | | |
|---|---|---|
| 4,898,792 A | 2/1990 | Singh et al. |
| 4,983,471 A | 1/1991 | Reichner et al. |
| 5,047,299 A | 9/1991 | Shockling |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,510,202 A | 4/1996 | McCoy et al. |
| 5,527,631 A | 6/1996 | Singh et al. |
| 5,573,867 A | 11/1996 | Zafred et al. |
| 5,601,937 A | 2/1997 | Isenberg |
| 5,688,611 A * | 11/1997 | Golben ...................... 429/53 |
| 5,733,675 A | 3/1998 | Dederer et al. |
| 5,741,605 A | 4/1998 | Gillett et al. |
| 6,013,385 A | 1/2000 | DuBose |
| 6,042,960 A | 3/2000 | DaCosta et al. |
| 6,280,865 B1 | 8/2001 | Eisman et al. |
| 6,329,090 B1 | 12/2001 | McElroy et al. |
| 6,403,245 B1 | 6/2002 | Hunt |
| 6,436,562 B1 | 8/2002 | DuBose |
| 6,579,638 B2 * | 6/2003 | Brassard ...................... 429/21 |
| 6,586,124 B2 * | 7/2003 | Kelley et al. ................. 429/17 |
| 6,592,741 B2 * | 7/2003 | Nakanishi et al. .......... 205/343 |
| 6,610,193 B2 * | 8/2003 | Schmitman ................ 205/628 |
| 6,620,536 B1 * | 9/2003 | Strobel et al. ............... 429/19 |
| 2002/0058175 A1 | 5/2002 | Ruhl |

OTHER PUBLICATIONS

Syntroleum, S–2 Synthetic Diesel, Driving Clean–Fuel Innovation, http://www.syntroleum.com/media/syntroleum_s2.pdf, no month/year available.
US 2003/0162067 A1, Published Aug. 28, 2003.
US 2003/0205641 A1, Published Nov. 6, 2003.
Cell and Stack Construction: Low–Temperature Cells, L.G. Austin, NASA SP–120, 1967, no month available.
Low Cost, High Efficiency Reversible Fuel Cell Systems, Proceedings of the 2002 U.S. DOE Hydrogen Program Review, NREL/CP–610–32405, no month available.
Low Cost Reversible Fuel Cell System, Proceedings of the 2000 U.S. DOE Hydrogen Program Review, Jun. 15, 2000, NREL/CP–570–28890.
Low Cost, Compact Solid Oxide Fuel Cell Generator, NASA Small Business Innovation Research Program, no month/year available.

(List continued on next page.)

*Primary Examiner*—Bruce F. Bell
(74) *Attorney, Agent, or Firm*—Foley & Lardner LLP

(57) ABSTRACT

A Solid Oxide Regenerative Fuel Cell (SORFC) system stores waste heat from the fuel cell in a heat storage material during the discharge mode. The heat is then used to heat water to be electrolyzed during the charge mode.

48 Claims, 15 Drawing Sheets-

OTHER PUBLICATIONS

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP–570–30535, no month available.

Regenerative Fuel Cells for High Altitude Long Endurance Solar Powered Aircraft, F. Mitlitsky, et al, 28th Intersociety Energy Conversion Engineering Conference (IECEC), Jul. 28, 1993, UCRL–JC–113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL–JC–117130.

www.synetix.com/methanol/pdfs/general/shortlpm.pdf Synetix Low Pressure Methanol (LPM) Process, no month/year available.

Flouride Salts as Phase Change Materials for Thermal Energy Storage in the Temperature Range 1000–1400 K, Thermal Analysis and Heat of Fusion Measurements, Ajay K. Misra, *J. Electrochem. Soc.: Electrochemical Science and Technology*, vol. 135, No. 4, Apr. 1988.

Enthalpy of Fusion, 6–128 through 6–136, CRC Handbook of Chemistry and Physics, 77th Edition, D.R. Lide editor–in–chief, 1996–1997, no month available.

Chemistry: WebElements Periodic Table, pp. 1–2. www.webelements.com, no month/year available.

* cited by examiner

SOLID OXIDE REGENERATIVE FUEL CELL

This application claims benefit of priority of provisional application 60/420,259 filed on Oct. 23, 2002, which is incorporated by reference in its entirety.

BACKGROUND OF THE INVENTION

The invention generally relates to the fuel cells, and specifically to solid oxide regenerative fuel cells.

A solid oxide fuel cell (SOFC) is an electrochemical device that converts chemical energy directly into electrical energy. A Solid Oxide Regenerative Fuel Cell (SORFC) is an electrochemical device that converts chemical energy directly into electrical energy and subsequently reconverts electrical energy back to the original chemical energy. This device differs significantly from rechargeable batteries in that the chemicals are stored outside of the SORFC converter. The SORFC system has many building electrical energy storage applications that cannot be satisfied by batteries. For example, a SORFC system for building power generation is discussed in the Proceedings of the 2001 DOE Hydrogen Program Review NREL/CP-570-30535. The SORFC requires additional heat to vaporize stored water that will be electrolyzed during charge mode. This increases the cost and decreases the efficiency of the SORFC operation.

BRIEF SUMMARY OF THE INVENTION

In one preferred aspect of the present invention, there is provided a method of operating a regenerative fuel cell system, comprising providing a fuel and oxidizer into a fuel cell during discharge mode, storing waste heat generated by the fuel cell during the discharge mode, heating water using the stored waste heat during charge mode, and electrolyzing the heated water in the fuel cell during the charge mode.

In another preferred aspect of the present invention, there is provided a fuel cell system comprising a regenerative fuel cell and a heat storage material which is adapted to store waste heat from the fuel cell during discharge mode and which is adapted to heat water provided into the fuel cell for electrolyzation during charge mode.

DETAILED DESCRIPTION OF THE PREFERRED EMBODIMENTS

Figure 1:
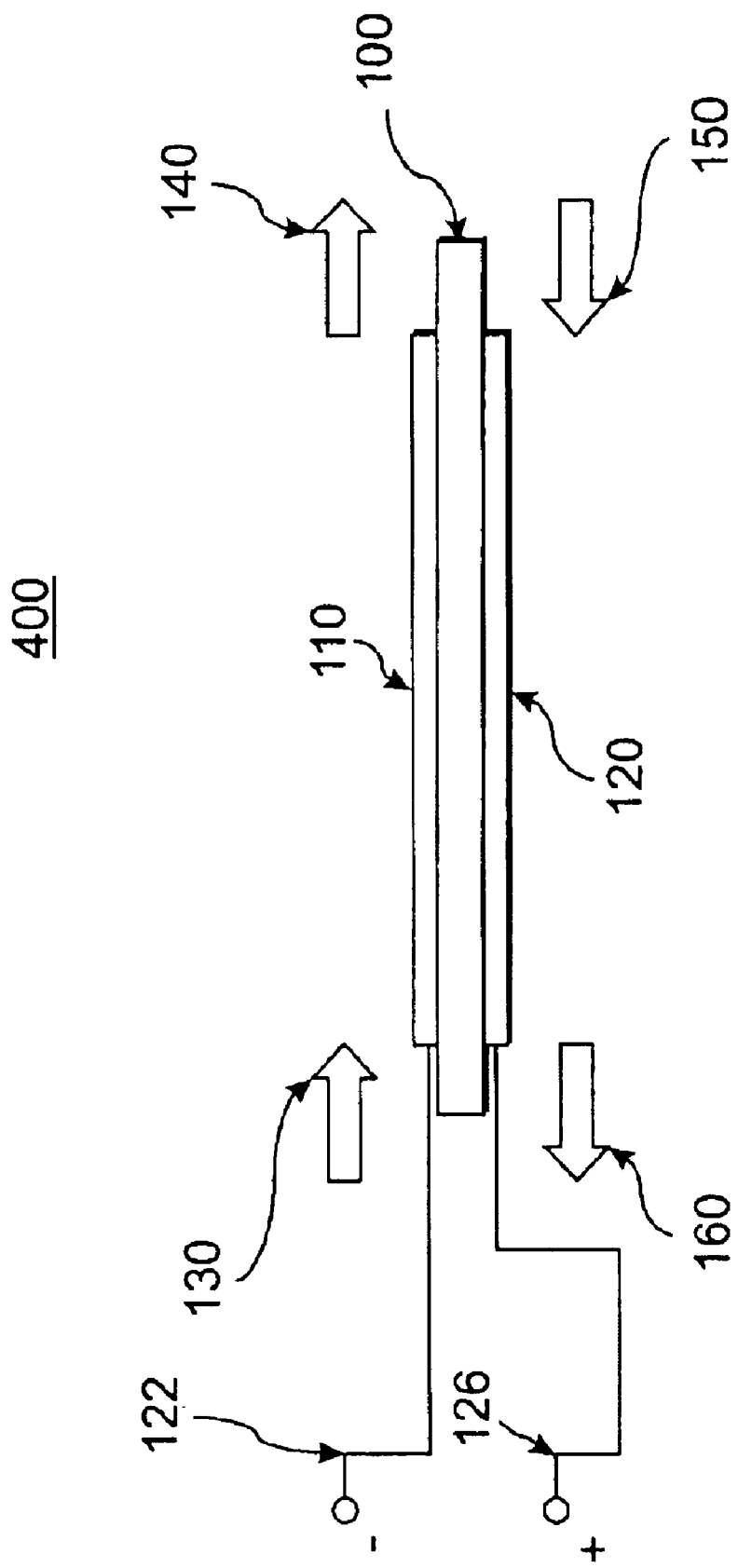
FIG. 1 is a schematic illustration of basic elements of SORFC in discharge mode.

The present inventors realized that in the SORFC, the high temperature operation affords the opportunity to store waste heat produced in the fuel cell operating mode to be later used to heat water to be electrolyzed during the electrolysis mode. The present inventors have realized that the heat can be stored several different ways, preferably in a heat storing material. Preferably, the heat storing material is a material which changes its characteristics to store heat, such as a phase change heat storage material which melts to store heat or a gas absorbing or a gas adsorbing material which stores heat by gas desorption.

In one preferred heat storage method, the adsorption/desorption of a gas, such as carbon dioxide, from an adsorbent material, such as a zeolite material, can store heat in the form of pressurized gas. In another preferred heat storage method, the absorption/desorption of hydrogen from a hydrogen storage material, such as magnesium hydride, can store heat in the form of desorbed hydrogen. In another preferred heat storage method the melting of a high heat of fusion material, such as aluminum chloride or sodium chlorate, can store heat by a high heat of fusion process. Any one, two or all three methods can be used to store waste heat. Any and all of these methods can store fuel cell waste heat that can later be used in water vaporization and heating for electrolysis charging and increase the SORFC efficiency to the 70% to 80% and above range.

In the first preferred method, the waste heat is stored and released by adsorption and desorption of a gas from an adsorbent material. Any suitable gas and adsorbent material may be used. The preferred gas is carbon dioxide and the preferred adsorbent material is any suitable type of zeolite material that can adsorb and desorb a gas, such as carbon dioxide. For example, the zeolite can hold a large quantity of carbon dioxide at ambient temperature and pressure. When heat is added to the zeolite, the carbon dioxide is desorbed and becomes pressurized. The carbon dioxide can then be stored in a separate pressure vessel at elevated pressure and isolated from the zeolite. When heat is required, the pressurized carbon dioxide is allowed back into the zeolite bed and the bed heats rapidly due to the adsorption process. The heat can then be used to vaporize and heat water for the vapor electrolysis process. The heat will be generated as long as it is removed, the capacity of the zeolite is not reached, and the carbon dioxide supply is available. The cycle can be repeated for as long as desired as long as the carbon dioxide is not contaminated with a foreign gas and is not lost from the system.

In the second preferred method, the waste heat is stored and released by absorption and desorption of hydrogen from a material which releases heat when it absorbs hydrogen. Preferably, this material is a metal hydride. However, other suitable materials may be used instead. Many metal hydrides can absorb and desorb large quantities of hydrogen gas. Magnesium hydride is a preferred example of a metal hydride that operates at elevated temperatures. Other metal hydrides include iron titanium hydride and lanthanum hydride. During the water vapor electrolysis process (i.e., the SORFC charging mode), the generated hydrogen is absorbed into the hydride and in the process a large quantity of heat is generated. This heat is used to vaporize stored liquid water for the electrolysis process. During the fuel cell or discharge mode, hydrogen gas is desorbed from the hydride and cooling occurs. In order to continue the hydrogen delivery to the SORFC, additional heat should be added to the hydride. This heat can be the waste heat from the fuel cell. The cycle is then repeated as desired. Overall, the fuel cell waste heat is used at a later time to vaporize water for the electrolysis process.

In the third preferred method, the waste heat is stored and released by melting of a high heat of fusion material (also known as a phase change material) to store heat by a high heat of fusion process. Many materials have a high heat of fusion, and some of these materials have a high heat of fusion in the temperature range suitable for the SORFC application. The high heat of fusion material preferably has heat of fusion that is sufficiently high to vaporize water at ambient pressure and sufficiently low to allow the transfer of SORFC fuel cell mode waste heat into the material. Preferred materials that meet both of the criteria are aluminum chloride, sodium chlorate, sodium chloride, lithium fluoride and lithium hydride. However, other suitable organic and/or inorganic materials can be used instead. A list of preferred high heat of fusion (i.e., phase change materials) is provided in table I, below.

TABLE I

| Material | $T_{melt}$ [K] | Specific latent heat of fusion [kJ/g] |
|---|---|---|
| Hectane | 388 | 0.29 |
| Meso-Erythritol | 391 | 0.34 |
| Erythritol | 393 | 0.32 |
| $Mn(NO_3)_2 \cdot 6H_2O$ | 421 | 0.25 |
| D-Mannitol | 440 | 0.33 |
| p-Hydroquinone | 445 | 0.25 |
| Lithium | 454 | 0.43–0.66 |
| Succinic acid | 461 | 0.28 |
| Galactitol | 462 | 0.35 |
| $AlCl_3$ | 466 | 0.26–0.27 |
| LiOH—NaOH | 490 | 0.34 |
| $ClLiO_4$ | 509 | 0.27 |
| $BHO_2$ | 509 | 0.33 |
| $LiNO_3$ | 527 | 0.36–0.38 |
| LiCl—LiOH | 535 | 0.44 |
| $NaOH/Na_2CO_3$(7.2%) | 556 | 0.34 |
| $Cl_3Fe$ | 577 | 0.27 |
| $MgH_2$ | 600 | 0.53 |
| NaCl/KCl(32.4%)/LiCl(32.8%) | 619 | 0.28 |
| NaCl(26.8%)/NaOH | 643 | 0.37 |
| $MgCl_2$—NaCl—KCl | 658 | 0.46 |
| NaCl(42.5%)/KCl(20.5%)/$MgCl_2$ | 662 | 0.41 |
| Al—Mg—Zn | 716 | 0.31 |
| NaCl—$MgCl_2$ | 723 | 0.43 |
| $B_2O_3$ | 723 | 0.35 |
| LiOH | 744 | 0.87–1.10 |
| Al—Cu—Si | 844 | 0.42 |
| LiCl | 883 | 0.47 |
| LiF—NaF—$MgF_2$ | 923 | 0.86 |
| Magnesium | 923 | 0.35 |
| Aluminum | 933 | 0.40 |
| $Cl_2Fe$ | 950 | 0.34 |
| LiH | 962 | 2.84–3.26 |
| $Cl_2Mg$ | 987 | 0.45 |
| Cu—Zn—P | 993 | 0.37 |
| $CLi_2O_3$ | 996 | 0.55–0.61 |
| LiF.30$MgF_2$ | 1001 | 0.52 |
| $Cl_2Co$ | 1013 | 0.35 |
| $Na_2O.2B_2O_3$ | 1015 | 0.40 |
| LiF—$MgF_2$ | 1019 | 0.90 |
| NaBr | 1020 | 0.25 |
| LiF—15$KMgF_3$ | 1022 | 0.86 |
| NaF—22$CaF_2$—13$MgF_2$ | 1027 | 0.54 |
| LiF—20$CeF_3$ | 1029 | 0.50 |
| LiF—19.5$CaF_2$ | 1042 | 0.82 |
| KCl | 1044 | 0.36 |
| $CaCl_2$ | 1048 | 0.25 |
| KF—15$CaF_2$ | 1053 | 0.44 |
| KF—15$MgF_2$ | 1063 | 0.52 |
| NaF—20$KMgF_3$ | 1068 | 0.65 |
| NaCl | 1074 | 0.48 |
| NaF—20$MgF_2$—16KF | 1077 | 0.65 |
| NaF—32$CaF_2$ | 1083 | 0.60 |
| $Cl_2Cr$ | 1087 | 0.26 |
| $K_2O.2B_2O_3$ | 1088 | 0.44 |
| Arsenic | 1090 | 0.33 |
| NaF—23$MgF_2$ | 1103 | 0.63 |

TABLE I-continued

| Material | $T_{melt}$ [K] | Specific latent heat of fusion [kJ/g] |
|---|---|---|
| $CuF_2$ | 1109 | 0.54 |
| LiF | 1121 | 1.044–1.08 |
| KF | 1129 | 0.47–0.48 |
| $ZnF_2$ | 1145 | 0.40 |
| NaF—40$MgF_2$—20$CaF_2$ | 1187 | 0.59 |
| $Na_2O$ | 1193 | 0.76–0.77 |
| $Li_2O.2B_2O_3$ | 1198 | 0.71 |
| Germanium | 1213 | 0.50–0.51 |
| Si—Mg | 1219 | 0.76 |
| $NaBO_2$ | 1239 | 0.55 |
| $CaF_2$—50$MgF_2$ | 1250 | 0.54 |
| $CaO.2B_2O_3$ | 1260 | 0.58 |
| $K_3AlF_6$ | 1263 | 0.47 |
| NaF | 1268 | 0.79–0.89 |
| NaF—60$MgF_2$ | 1269 | 0.71 |
| KF—69$MgF_2$ | 1279 | 0.77 |
| $Cl_2Ni$ | 1282 | 0.76 |
| $Na_3AlF_6$ | 1283 | 0.53 |
| $NaMgF_3$ | 1295 | 0.67 |
| KF—61$CaF_2$ | 1328 | 0.45 |
| AlSb | 1333 | 0.55 |
| $KCaF_3$ | 1343 | 0.47 |
| $KMgF_3$ | 1345 | 0.71 |
| $Na_2SiO_3$ | 1362 | 0.42 |
| $Mg_2Si$ | 1373 | 1.09 |
| $GeO_2$ | 1389 | 0.42 |
| $MgF_2$—40$CeF_3$ | 1393 | 0.42 |

It should be noted that the specific latent heat of fusion of some materials in Table I varies depending on different measurement. Preferably, a phase change material with a specific latent heat of fusion of greater than 0.5 kJ/g, preferably greater than 1 kJ/g is used. Preferably, these materials have a phase change temperature between 374 K and 1400 K. During the fuel cell mode of SORFC operation, heat is exchanged into the material and the material is melted, with large quantities of heat absorbed during the melting process. During the electrolysis mode of the SORFC operation, water is vaporized and/or heated using the stored heat until the material has re-solidified.

The three preferred heat storage methods will be described in more detail below in reference to FIGS. 7–11. While the above methods were described with respect to vaporizing liquid water, the heating methods may be used to raise the temperature of water vapor instead. Furthermore, other rechargeable fuel cells, such as PEM cells, may be used instead of the SORFC.

A preferred SORFC system is described below. The SORFC system disclosed in U.S. provisional patent application Ser. No. 60/377,199 incorporated by reference in its entirety may be used. The SORFC system described below may be used to power an airborne vehicle, a ground based vehicle (i.e., automobile, etc.), water based vehicle (i.e., ship), a building or various devices requiring heat or power. Preferably, the SORFC is used to supplement power from an existing power grid for continuous power generation (i.e., if the power grid becomes inoperative) or for peak load shaving (i.e., charging from the grid during lower power load requirement and discharging during high power load requirements on the grid). However, other rechargeable fuel cells, such as PEM cells, may be used instead of the SORFC.

The SORFC is an electrochemical device based on a solid, oxygen ion conducting electrolyte, which is capable of generating electrical energy by oxidation of a fuel, and which is also capable of regenerating the oxidized fuel back into fuel.

FIG. 1 shows a functional schematic of a SORFC in "discharge" (otherwise known as "electricity generation" or "fuel cell") mode. The SORFC 400 contains a solid electrolyte 100, a fuel electrode 110 and an oxygen electrode 120. The electrolyte 100 is an oxygen ion conducting material such as a ceramic material. Preferably, yttria stabilized zirconia (YSZ) is used, but other materials, such as gadolinia doped ceria or scandia doped zirconia can also be used. The oxygen electrode 120 is made from a material that can conduct electrons in an oxidizing environment. Two preferred materials are strontium doped lanthanum manganite (LSM) and platinum, which is often mixed with an oxygen ion conductor such as YSZ. Other materials capable of conducting electrons in an oxidizing environment can also be used.

In non-regenerative solid oxide fuel cells (SOFC), nickel YSZ mixtures are commonly used as fuel electrodes 110 for electrical energy generation. Nickel requires a reducing environment in order to work properly. In a SORFC, the fuel electrode 110 is exposed to a reducing environment during discharge, but is exposed to an oxidized fuel during charge operation. Therefore, materials capable of conducting electrons in an oxidizing environment should be used at the fuel electrode 110. Similarly to the oxygen electrode 120, platinum that is mixed with YSZ or LSM is preferably used as a fuel electrode 110 material. Other materials that are capable of conducting electrons in an oxidizing environment can also be used.

The fuel supply 130 reaches the fuel electrode side of the SORFC 400. The fuel 130 is preferably hydrogen, but other fuels, for example hydrocarbons or oxygenated hydrocarbons can also be used. An oxidizer 150, preferably air, reaches the SORFC on the oxygen electrode side. Other oxidizer, for example pure oxygen can be used. The fuel reacts with oxygen available at the fuel electrode 110 and thereby creates a low oxygen partial pressure on the fuel electrode 110 side of the cell.

Electrically conductive electrodes 110 and 120 on both sides of the electrolyte 100 can provide and absorb electrons and thereby oxygen ions can be generated and consumed. The difference in partial pressure of oxygen between the fuel electrode 110 and the oxygen electrode 120 drives negatively charged oxygen ions from the oxygen electrode 120 through the electrolyte 100 to the fuel electrode 110. Thereby, negative electrical charge is transported from the oxygen electrode 120 to the fuel electrode 110. This charge transport generates an electrical potential difference between fuel electrode 110 and oxygen electrode 120, which can be used to drive an electrical circuit (not shown in Figures for clarity) connected to the SORFC via the fuel electrode electrical connection 122 and the oxygen electrode electrical connection 126.

Oxidized fuel leaves the SORFC in the oxidized fuel outflow 140. The oxidized fuel preferable consists of a mixture of water vapor and unreacted hydrogen, but other materials are also possible. Oxygen depleted oxidizer leaves the SORFC in the depleted oxidizer outflow 160. The oxygen depleted oxidizer is preferably air with a reduced oxygen content as compared to the oxidizer inflow 150, but other materials can also be used.

Figure 2:
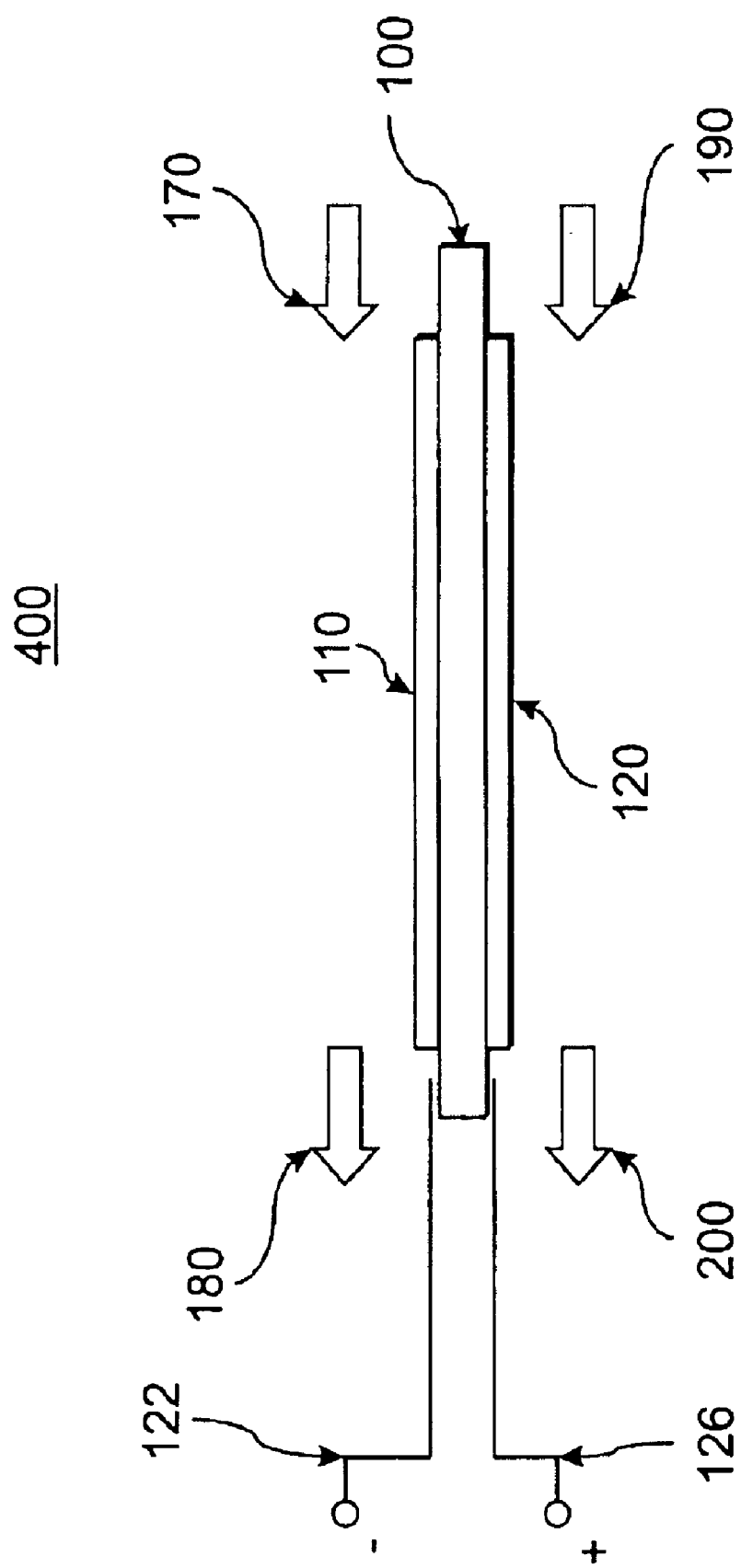
FIG. 2 is a schematic illustration of basic elements of SORFC in charge mode.

FIG. 2 illustrates a functional schematic of the SORFC 400 in a "charge" (otherwise known as "electrolysis" or "electrolyzer") mode. Oxidized fuel reaches the fuel electrode 110 at the oxidized fuel inflow 170. The oxidized fuel is preferably water vapor, but other materials, for example a mixture of carbon oxides and water vapor can also be used.

An electrical potential is applied through the fuel electrode electrical connection 122 and oxygen electrode electrical connection 126. This creates a driving force to electrolyze the oxidized fuel 170 at the fuel electrode 110 and transport the oxygen through the electrolyte 100 to the oxygen electrode 120. As in the discharge mode, the transfer of oxygen from the fuel electrode 110 through the electrolyte 100 to the oxygen electrode 120 occurs in the form of oxygen ion transport.

Regenerated fuel and residual oxidized fuel leave the SORFC at the regenerated fuel outflow 180. This mixture preferably consists of hydrogen and water vapor, but other materials are also possible. An optional oxygen electrode inflow 190 can be provided to the oxygen electrode 120. This optional oxygen electrode inflow 190 can, for example, provide temperature management of the SORFC, but can also serve other purposes and it may also be absent. Ambient air is a preferred material for the optional oxygen electrode inflow 190, but other materials can also be used. The regenerated oxidizer outflow 200 removes regenerated oxidizer and optional oxygen electrode inflow 190 from the cell. This regenerated oxidizer outflow preferably consists of pure oxygen or an oxygen air mixture, but other materials can also be used.

Figure 3:
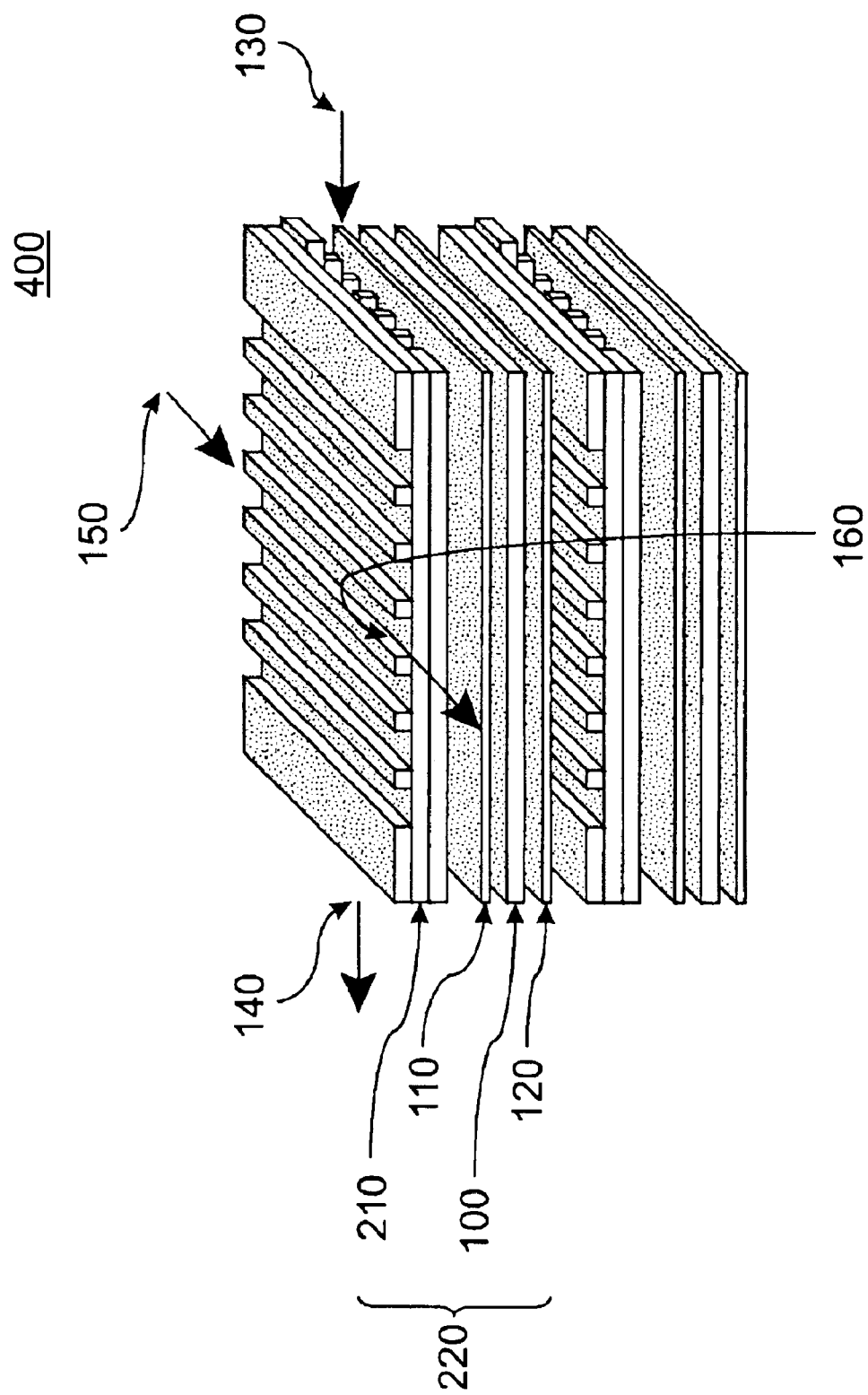
FIG. 3 is a three dimensional view of planar SORFC stack.

For practical use the SORFC can be packaged in a multi-cell system by stacking a number of the repeating elements 220 as shown in FIG. 3. The amount of power available from an SORFC depends on the electroded area. Multi-cell systems provide for convenient packaging of large electroded areas.

FIG. 3 illustrates an example for packaging of multiple SORFC. Here a planar electrolyte 100, with fuel electrode 110 and oxygen electrode 120 applied to either side of the planar electrolyte 100, is sandwiched between interconnect plates 210 thereby forming a stack. The elements shown in FIG. 3 can be repeated many times to form a large SORFC stack. The interconnect plate 210 serves several functions. The interconnect plate 210 separates the gas volume adjacent to the fuel electrode 110 from the gas volume adjacent to the oxygen electrode 120. This separation avoids uncontrolled reaction or mixing of the gases on the two sides of each electrolyte 100. In SORFC, this separation is also important to avoid losses of the fuel or oxidized fuel, which would limit the useful life of the energy storage device. The interconnect 210 also provides a flow path for the gases on either side of the electrolyte. For example, the gas flow paths may comprise grooves in plate 210.

FIG. 3 illustrates a system with the fuel inflow 130 on the right side of the SORFC stack and the oxidized fuel outflow 140 on the left side of the stack. The oxidizer flow proceeds from the oxidizer inflow 150 on the back side of the stack to the depleted oxidizer outflow 160 on the front of the stack. This cross-flow configuration is one preferred flow path. Other preferred flow paths are co-flow where both gases stream in the same direction and counter flow where the two gases flow in opposite directions. The system can also be provided with other flow paths, for example paths based on circular stack geometries. The interconnect plate 210 can also provide an electrical current path within the stack. One preferred example is an interconnect 210 fabricated from an electrically conductive material. One side of interconnect 210 contacts a fuel electrode 110, and the other side contacts an oxygen electrode 120. Current flows through the interconnect 210 to the fuel electrode 110, through the electrolyte 100, through the oxygen electrode 120, and then through the next interconnect 210. This group of conducting elements can be repeated. One preferred material for the interconnect 210 is a metal which expands at the same rate as the electrolyte 100 during temperature changes, such as a metal felt described in U.S. application Ser. No. 10/369,133, filed Feb. 20, 2003, incorporated herein by reference in its entirety. Other examples are high temperature alloys, ferritic steels, or electrically conductive ceramics. Other materials can be used for the interconnect 210. For many of these materials surface coatings may be added in order to achieve a chemically stable system.

In a SORFC, both sides of the interconnect 210 need to be capable of operating in an oxidizing environment. In contrast, in a SOFC, the side of the interconnect 210 facing the fuel electrode 110 can be operated solely in a reducing environment which poses relaxed requirements for the interconnect 210.

The planar stacked electrolytes in FIG. 3 are only one preferred example for packaging of SORFC. Other possibilities include, but are no limited to, cells in which the electrolyte is formed into tubes.

Figure 4:
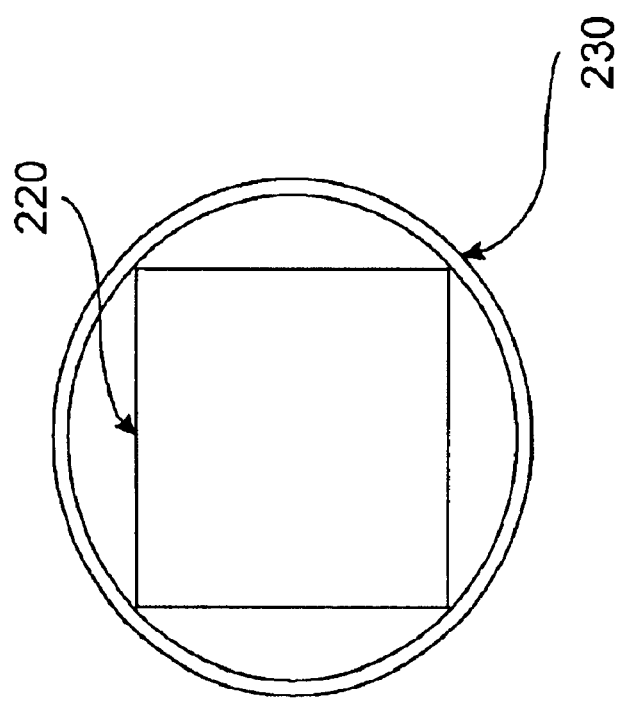
FIG. 4 is a schematic illustration of manifolded SORFC stack.

FIG. 3 does not show how the gases are manifolded in order to supply and remove gas from the repeating stack elements 220. FIG. 4 presents one preferred example for external manifolding of the stack elements shown in FIG. 3. The repeating elements 220 are mounted inside a circular cylinder 230. Gas distribution to the repeating elements 220 is provided in the space between the square stack repeating elements 220 and the inner wall of the circular cylinder 230. Other manifolding schemes are also possible.

The electrolyte 100 is preferably between 50 and 400 micrometer thick, such as 100–200 micrometer thick. Systems with thinner and thicker electrolytes are also possible. The fuel electrode 110 is preferably 20 to 50 micrometer thick, such as 30–40 micrometer thick, while the preferred thickness for the oxygen electrode 120 is between 30 and 80 micrometer, such as 45–65 micrometer thick. Other electrode thicknesses are possible. The interconnect 210 is preferably 1 to 5 mm thick, such as 2–4 mm thick. Preferred operating voltages during discharge are 0.6V to 1.0V per cell. Preferred operating voltages during charging are 1.0 to 2.1V per cell. Different voltages may be used in operation. Preferred power densities during discharge range between 100 and 1000 mW per square centimeter, such as 100–300 mW per square centimeter of electroded area. Preferred current densities during charging range between 100 and 2000 mA per square centimeter, such as 500–1500 mA per square centimeter electroded area. Larger and smaller values for power density and current density are possible. The preferred active area for each cell within a stack ranges between 9 and 500 square centimeter. The preferred dimension for the cell stack elements shown in FIG. 3 is a side length between 3 and 25 cm, such as 7–15 cm. The preferred number of cells within a stack ranges from 5 cells to 200 cells, such as 50–100 cells. Larger and smaller cells as well as more and fewer cells per stack are possible.

FIGS. 5–8 illustrate a preferred SORFC system in which the fuel and the oxidized fuel are stored and regenerated. It is possible to also store and regenerate the oxidizer. However, one of the major advantages of SORFC is the ability to operate for an unlimited number of cycles without oxidizer storage.

Figure 5:
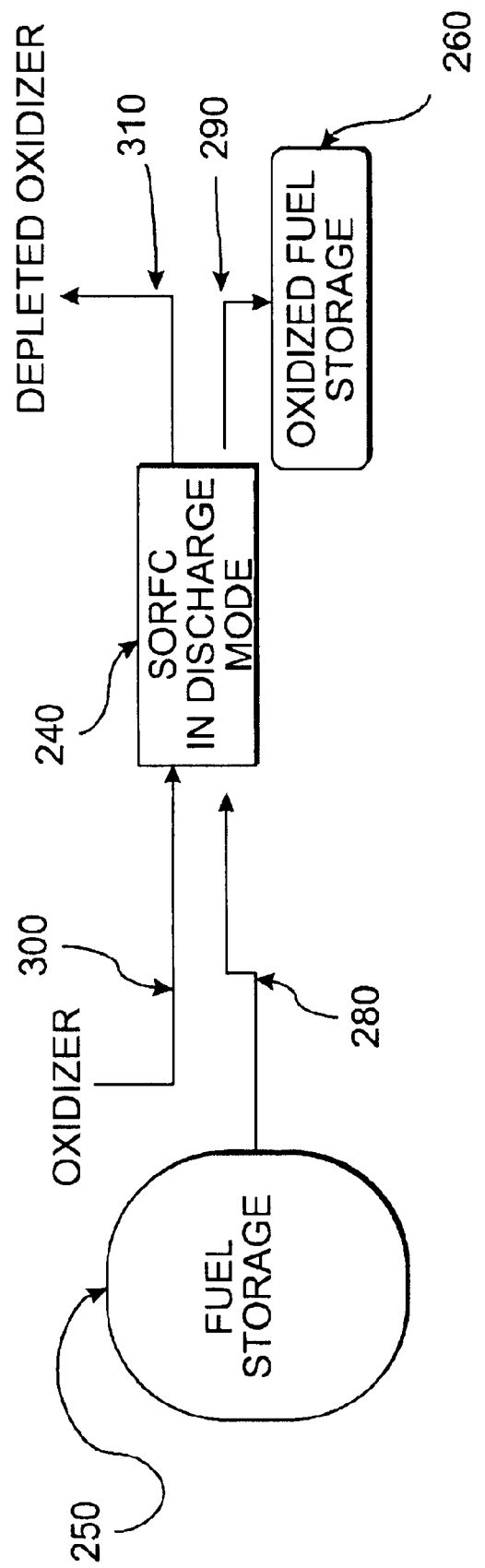
FIG. 5 is a schematic illustration of SORFC system in discharge mode.

The SORFC energy storage system in discharge or electricity generation mode is illustrated in FIG. 5. Fuel is stored in the fuel storage vessel or tank 250. In one preferred embodiment the fuel is hydrogen which is stored as compressed gas. Other preferred storage options for hydrogen fuel include, but are not limited to cryogenic storage, metal hydrides, carbon adsorption (graphite, nanotube, or activated), sodium borohydride, and glass microspheres. The fuel tank SORFC connecting line 280 delivers fuel to the SORFC system 240. Oxidizer is provided from ambient through oxidizer inlet line 300 to the SORFC system 240. In the SORFC system 240, fuel is oxidized with the oxidizer and electrical energy and heat are generated. The oxidized fuel is delivered to the oxidized fuel storage tank 260 through the oxidized fuel tank SORFC system connecting line 290. In one preferred aspect, the oxidized fuel is water, and the water is stored in its liquid, solid, or partly frozen state. The depleted oxidizer is vented to ambient through the oxidizer outlet line 310.

Figure 6:
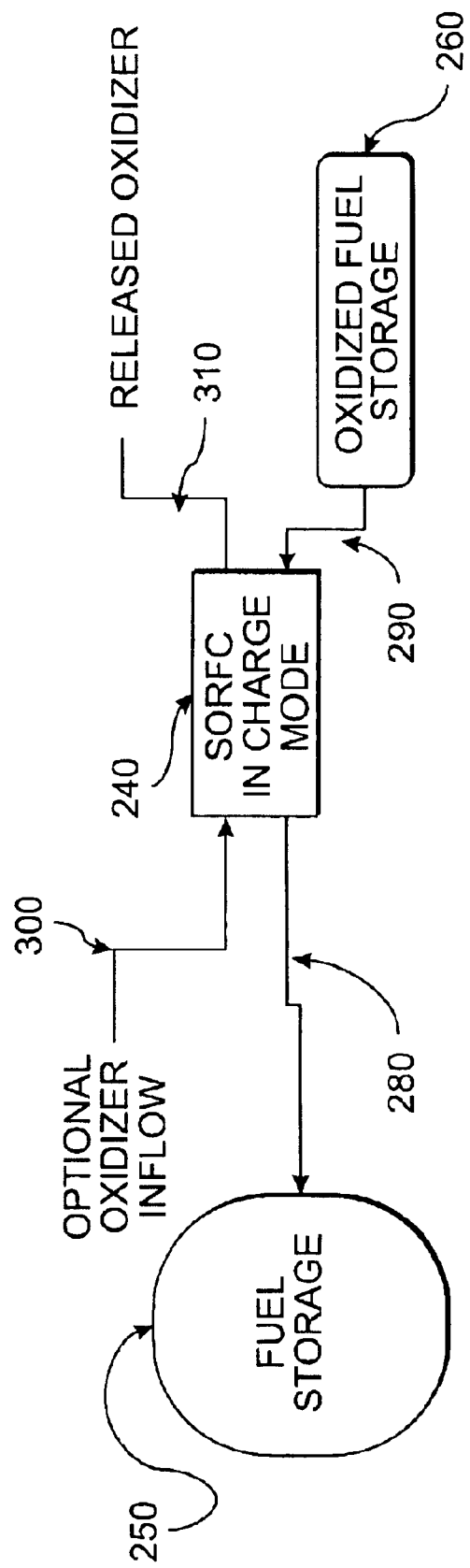
FIG. 6 is a schematic illustration of SORFC system in charge mode.

FIG. 6 illustrates the SORFC energy storage system in charge or electrolyzer mode. Stored oxidized fuel is provided from the oxidized fuel storage tank 260 to the SORFC system 240 via the oxidized fuel tank SORFC system connecting line 290. In the SORFC system 240, oxidized fuel is electrolyzed to fuel and oxidizer. The fuel generated is transported to the fuel storage tank 250 through the fuel tank SORFC system connecting line 280. The oxidizer generated in the SORFC system 240 is vented back to ambient through the oxidizer outlet line 310. Optionally, fresh oxidizer (i.e., air) can be provided to the SORFC system 240 during the charge mode through the oxidizer inlet line 300. This optional inlet stream can for example serve as the thermal control of the SORFC system.

Figure 7:
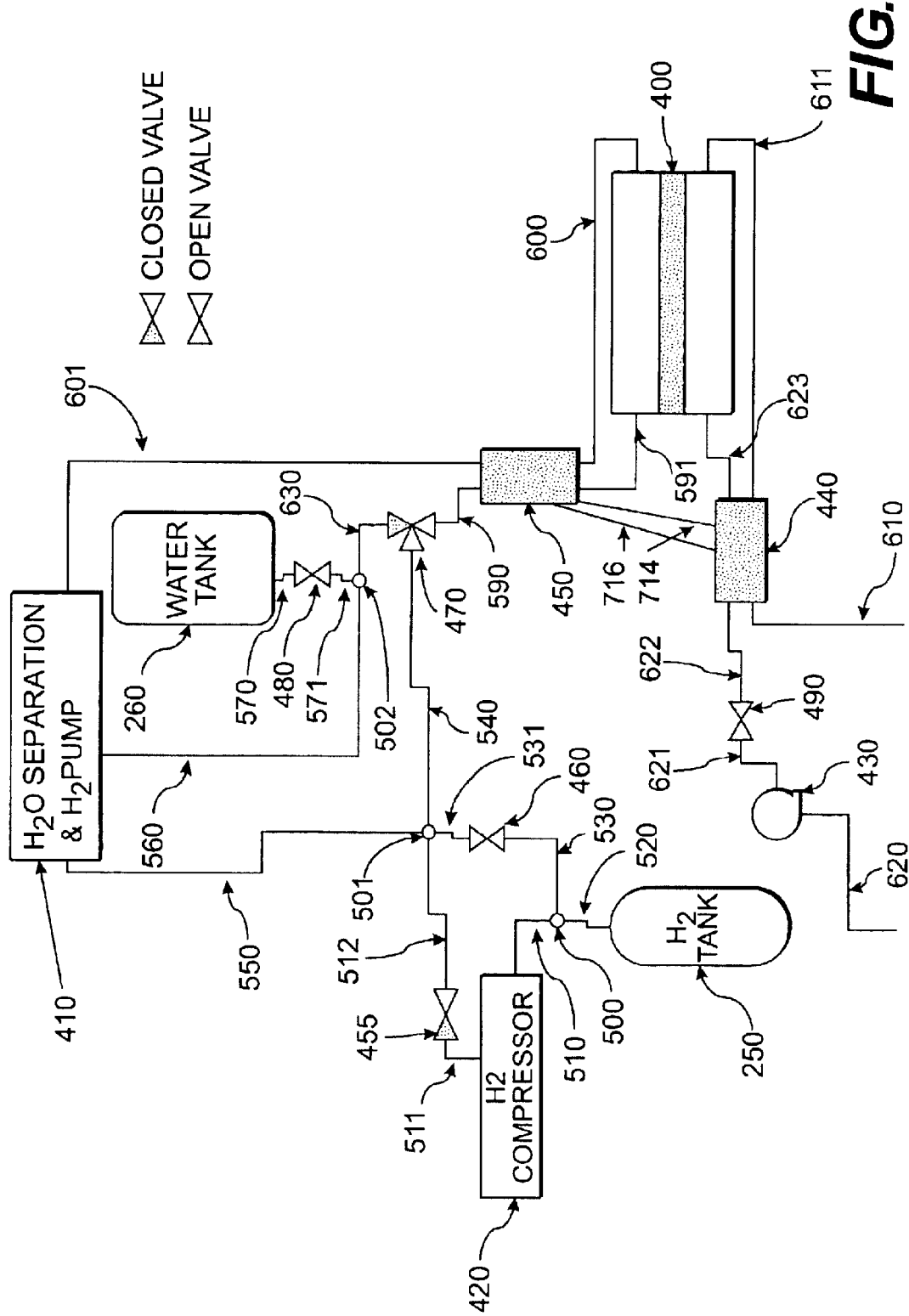
FIGS. 7, 9 and 13 are schematic illustrations of SORFC system components in discharge mode.

FIG. 7 illustrates one preferred layout of the SORFC energy storage system, which includes fuel and oxidizer flow control. FIG. 7 illustrates this system in discharge mode. Fuel from the fuel storage tank 250 is provided to the SORFC input selector valve 470 through the fuel tank delivery line 520, the fluids junction 500, the fuel compressor bypass line 530, the fuel compressor bypass valve and regulator 460, the fuel compressor bypass line 531 the fluids junctions 501, and the fuel delivery line 540. An additional stream of fuel from the water/hydrogen separator and pump 410 is also delivered to the SORFC input selector valve 470 through the separator fuel outlet line 550, the fluids junction 501, and the fuel delivery line 540.

The fuel is transported from the SORFC input selector valve 470 to the SORFC 400 via the SORFC fuel side input lines 590 and 591. The fuel passes through a heat sink/heat source section 450 which will be described in detail with respect to FIGS. 9 and 10 below. In the SORFC 400, the fuel is reacted with oxidizer and generates electrical energy and heat. In a preferred layout, the fuel is only partially oxidized, and the partially oxidized fuel (i.e., hydrogen and water) is transported to the separator and pump 410 via the SORFC fuel side outlet lines 600 and 601. Preferably, the section 450 extracts heat from the partially oxidized fuel. The heat extracted from the partially oxidized fuel is used to heat the fuel inflow to the SORFC 400.

In the separator and pump 410 oxidized fuel (i.e., water) and fuel (i.e., hydrogen) are separated. This separator and pump 410 can preferably be a centrifugal device that both separates and adds energy to (i.e. pressurizes) the liquid and the gaseous components. The fuel is pressurized and returned to the SORFC input selector valve 470 through the separator fuel outlet line 550, the fluids junction 501, and the fuel delivery line 540, as described previously. The oxidized fuel (i.e., water) is transported from the separator and pump 410 to the oxidized fuel tank 260, via the separator oxidized fuel outlet line 560, the fluids junction 502, the oxidized fuel tank line 571, the oxidized fuel storage valve and regulator 480, and the oxidized fuel tank line 570. The separator and pump 410 delivers the oxidized fuel at a pressure suitable for storage in tank 260. In one preferred embodiment the fuel storage tank 250 and the oxidized fuel storage tank 260 are combined in one vessel. For the preferred option of hydrogen fuel and water as the oxidized fuel, fuel and oxidized fuel can be easily separated due to their different phases (gas vs. liquid). The gaseous fuel can provide pressurization for the liquid oxidized fuel and thereby facilitate delivery of the oxidized fuel during charge mode.

Oxidizer, such as air, needed for the oxidation of the fuel is provided to the SORFC 400 through the SORFC oxidizer side inlet lines 620, 621, 622, and 623, and the oxidizer input valve 490. The oxidizer is driven into the SORFC 400 by the oxidizer blower 430. The oxidizer can be preheated in the optional oxidizer heat exchanger section 440 that will be described in more detail below with respect to FIGS. 9–10. The depleted oxidizer is vented through the SORFC oxidizer side outlet lines 610 and 611. Lines 610 and 611 preferably pass through the optional oxidizer heat exchanger section 440 to extract heat from the depleted oxidizer outlet stream and thereby preheat the oxidizer inflow. Alternatively, the incoming fuel may be preheated by the depleted oxidizer stream and/or the incoming oxidizer may be preheated by the oxidized fuel stream, if the location of lines 600/601 and/or 610/611 is reversed with respect to sections 440, 450.

The valve and regulator 460 is open in the discharge mode, while the fuel compressor valve 455 is closed. Valve 470 is a three way valve, which is switched to allow fuel flow between lines 540 and 590, while preventing oxidized fuel flow from line 630 to line 590.

Figure 8:
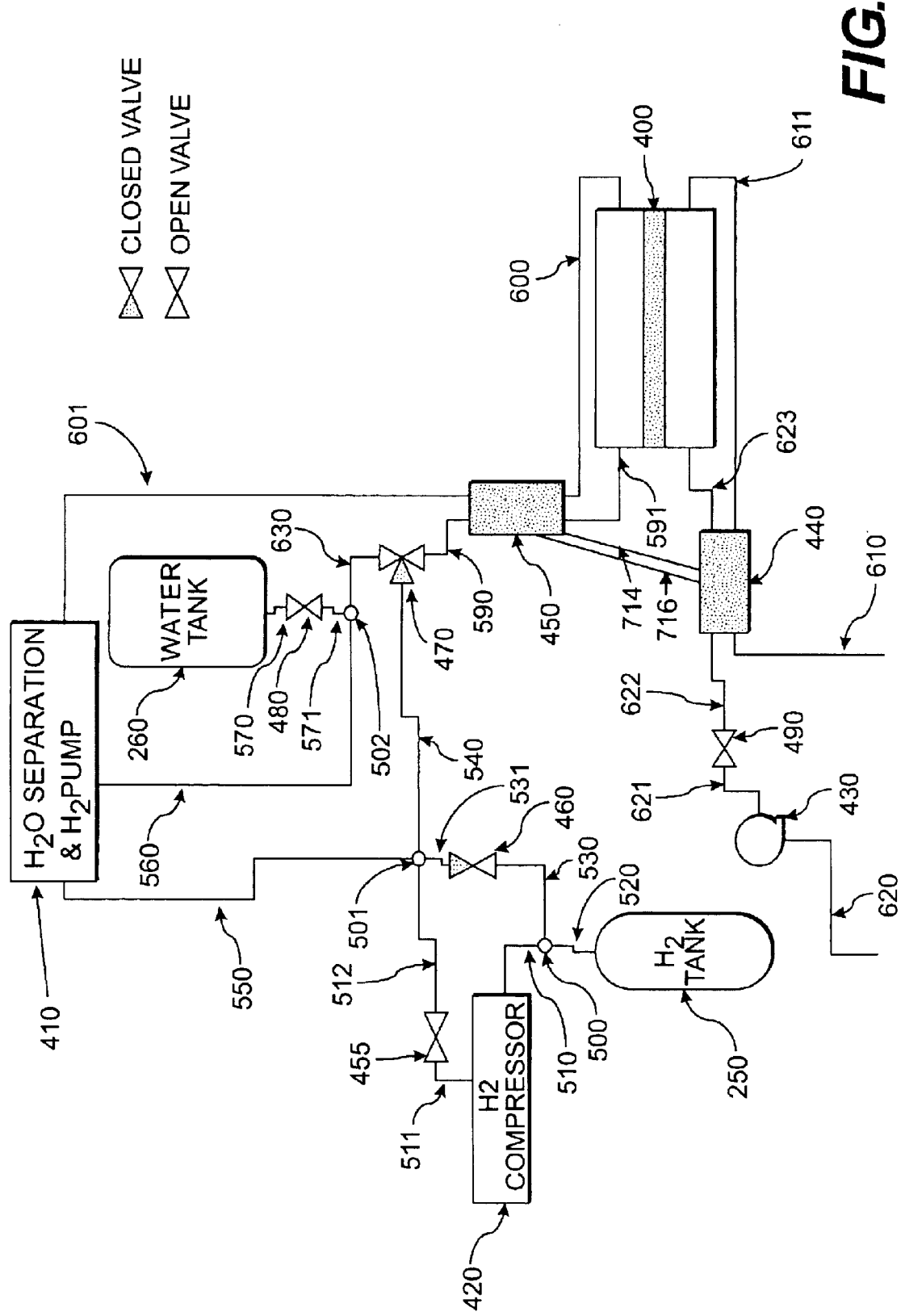
FIGS. 8, 10 and 14 are schematic illustrations of SORFC system components in charge mode.

FIG. 8 illustrates how the system shown in FIG. 7 operates in the charge mode. Oxidized fuel (i.e., water) is delivered to the SORFC input selector valve 470 from the oxidized fuel storage tank 260 via the oxidized fuel tank line 570, the open oxidized fuel storage valve and regulator 480, the oxidized fuel tank line 571, the fluids junction 502, and the oxidized fuel delivery line 630. Additional oxidized fuel is provided from the separator and pump 410 to the SORFC input selector valve 470 via the separator oxidized fuel outlet line 560, the fluids junction 502, and the oxidized fuel delivery line 630. The oxidized fuel is transported from the SORFC input selector valve 470 to the SORFC 400 through the SORFC fuel side input lines 590 and 591. The oxidized fuel can be preheated in section 450.

In the SORFC 400, the oxidized fuel is electrolyzed. Partly regenerated fuel (i.e., hydrogen and water) is transported from the SORFC 400 to the separator and pump 410 through the SORFC fuel side outlet lines 600 and 601. Section 450 can extract heat from the partially regenerated fuel and provide pre-heat to the oxidized fuel inflow. In the separator and pump 410, the regenerated fuel (i.e., hydrogen) and oxidized fuel (i.e., water) are separated. Fuel is transported from the separator and pump 410 to the fuel tank 250 through the separator fuel outlet line 550, the fluids junction 501, the fuel compressor line 512, the optional fuel compressor valve 455, the fuel compressor line 511, the optional fuel compressor 420, the fuel compressor line 510, the fluids junction 500, and the fuel tank delivery line 520. The optional compressor 420 pressurizes the fuel for storage in the fuel storage tank 250. The optional compressor 420 is preferably an electrochemical hydrogen pump. Oxidized fuel from the separator and pump 410 is recirculated to the SORFC input selector valve 470 via the separator oxidized fuel outlet line 560, the fluids junction 502, and the oxidized fuel delivery line 630. The separator and pump 410 brings the output oxidized fuel to a pressure suitable for recirculation.

Regenerated oxidizer is vented from the SORFC 400 to ambient via the SORFC oxidizer side outlet lines 610 and 611. The optional oxidizer heat exchanger section 440 can extract heat from the regenerated oxidizer outflow. Optionally, additional oxidizer can be provided from ambient to the SORFC 400 through the SORFC oxidizer inlet line 620, the oxidizer blower 430, the SORFC oxidizer inlet line 621, the oxidizer input valve 490, the SORFC oxidizer inlet line 622, and the SORFC oxidizer inlet line 623. The optional oxidizer heat exchanger section 440 can add heat to the oxidizer inflow. In one preferred embodiment the optional oxidizer inflow provides thermal control for the SORFC 400.

The valve and regulator 460 is closed in the charge mode, while valve 455 is open. Valve 470 is a three way valve, which is switched to prevent fuel flow between lines 540 and 590, while allowing oxidized fuel flow from line 630 to line 590.

The SORFC system 240 described previously contains the SORFC 400 and controlling elements, associated electrical circuits, peripheral fluid lines, valves and heat exchangers. The fuel tank SORFC system connecting line 280 includes lines 510, 511, 512, 520 and 540. The oxidized fuel tank SORFC system connecting line includes lines 560, 570, 571, 590, 591, 600, 601, and 630. The oxidizer inlet line 300 includes lines 620, 621, 622, and 623. The oxidizer outlet line 310 includes lines 610 and 611.

The SORFC energy storage system can be sized for a wide range of power and energy storage requirement. Preferred power levels range from 1 kW to 10 MW, but smaller and larger systems are possible. There are virtually no limits for the amount of energy that can be stored. Appropriate tank sizing can store energy from a few Whr (Watt hours) to GWhr (Gigawatt hours). The SORFC energy storage system is especially advantageous at large energy levels, where large energy storage densities can be realized. Energy storage densities in excess of 450 Whr/kg can be realized. Energy storage efficiencies (energy available in discharge divided by energy needed to charge) on the order of about 0.5 to about 0.87 can be realized.

Figure 9:
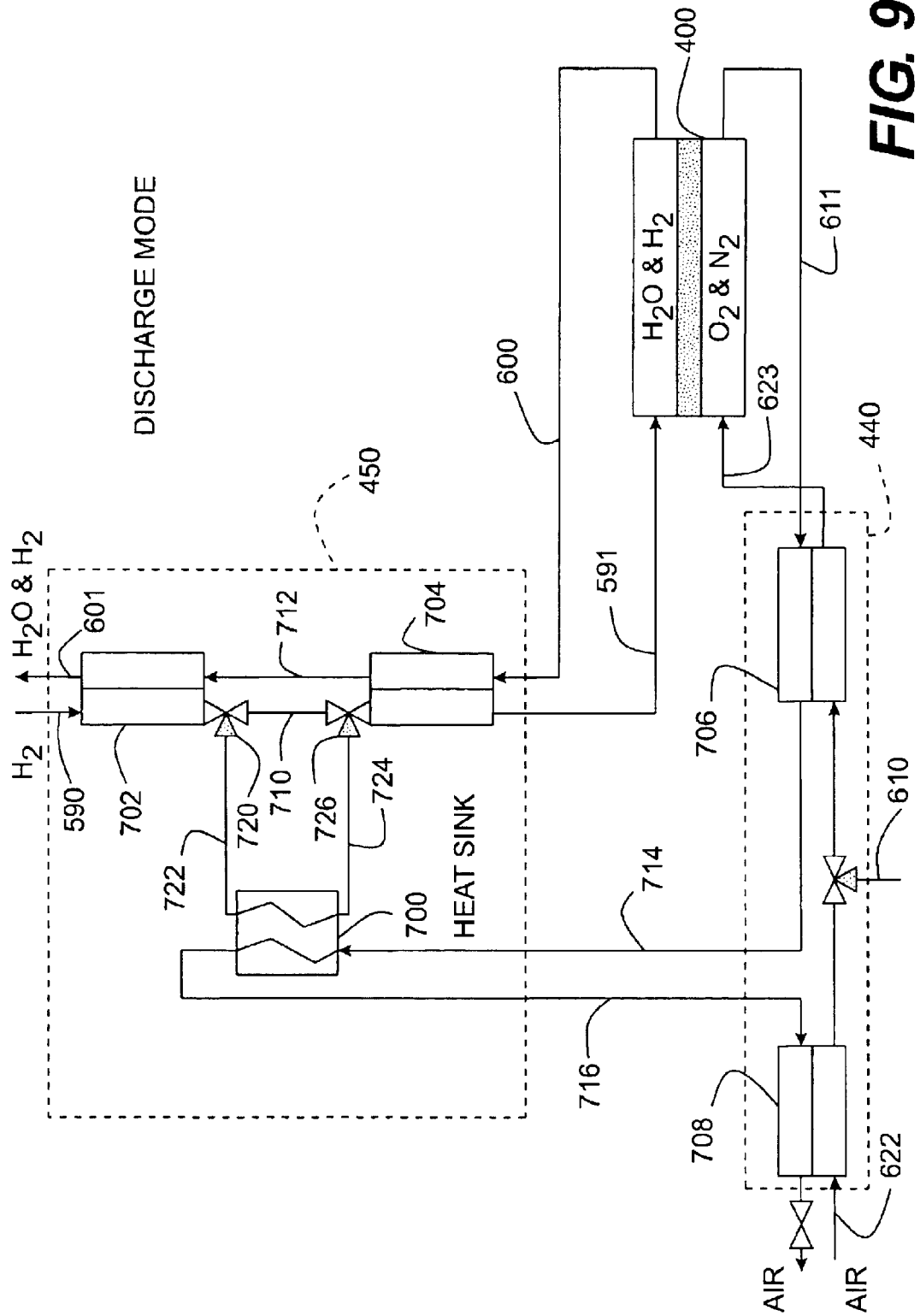

FIG. 9 illustrates the details of the heat sink/heat source section 450 and the heat exchanger section 440 in discharge or electricity generation (i.e., fuel cell) mode, which are shown as black boxes in FIG. 7. Section 450 contains a heat sink/heat source 700, which functions as a heat sink in discharge mode. The heat sink 700 may comprise a gas tank and an absorbent bed, as discussed in more detail with respect to FIG. 11, it may comprise the hydrogen fuel tank 250 containing the metal hydride hydrogen storage material or it may comprise a tank containing a high heat of fusion material. Section 450 also preferably contains an optional first heat exchanger 702 and an optional second heat exchanger 704. Three way valves 720, 726 close access to lines 722 and 724. Section 440 contains at least one heat exchanger. Preferably, section 440 contains at least one exchanger 708 and optionally a second heat exchanger 706.

The hydrogen fuel enters heat exchanger 702 through line 590. The hydrogen temperature is raised therein. The hydrogen then proceeds into heat exchanger 704 through line 710. The hydrogen temperature is raised even higher therein. The hydrogen fuel then enters the SORFC 400 through line 591, as discussed above.

The water vapor and remaining hydrogen then exit SORFC 400 through line 600 and pass through heat exchangers 704 and 702 and line 712 and exit section 450 through line 601. The water vapor is cooled to liquid water before entering line 601. The exiting hydrogen and water vapor heat the entering hydrogen fuel via the heat exchangers 704, 702.

Air enters section 440 through line 622 and is heated in heat exchangers 706 and 708. Air then enters SORFC 400 through line 623. Depleted air with waste heat exits SORFC 400 through line 611 and heats the incoming air in heat exchanger 706. The depleted air with waste heat then enters the heat sink area 700 via line 714. The waste heat is used to heat the heat sink 700. The depleted air then exist the heat sink area 700 through line 716 into optional heat exchanger 708 to further heat incoming air.

When the waste heat in the depleted air heats the heat sink 700, the waste heat is stored in the heat sink for future use in the charge or electrolyzer mode. The waste heat is stored in the heat sink 700 by desorbing pressurized carbon dioxide from the zeolite into a gas storage tank, by desorbing hydrogen from the metal hydride storage in the hydrogen storage tank 250 or by absorbing heat through melting of the high heat of fusion material.

Figure 10:
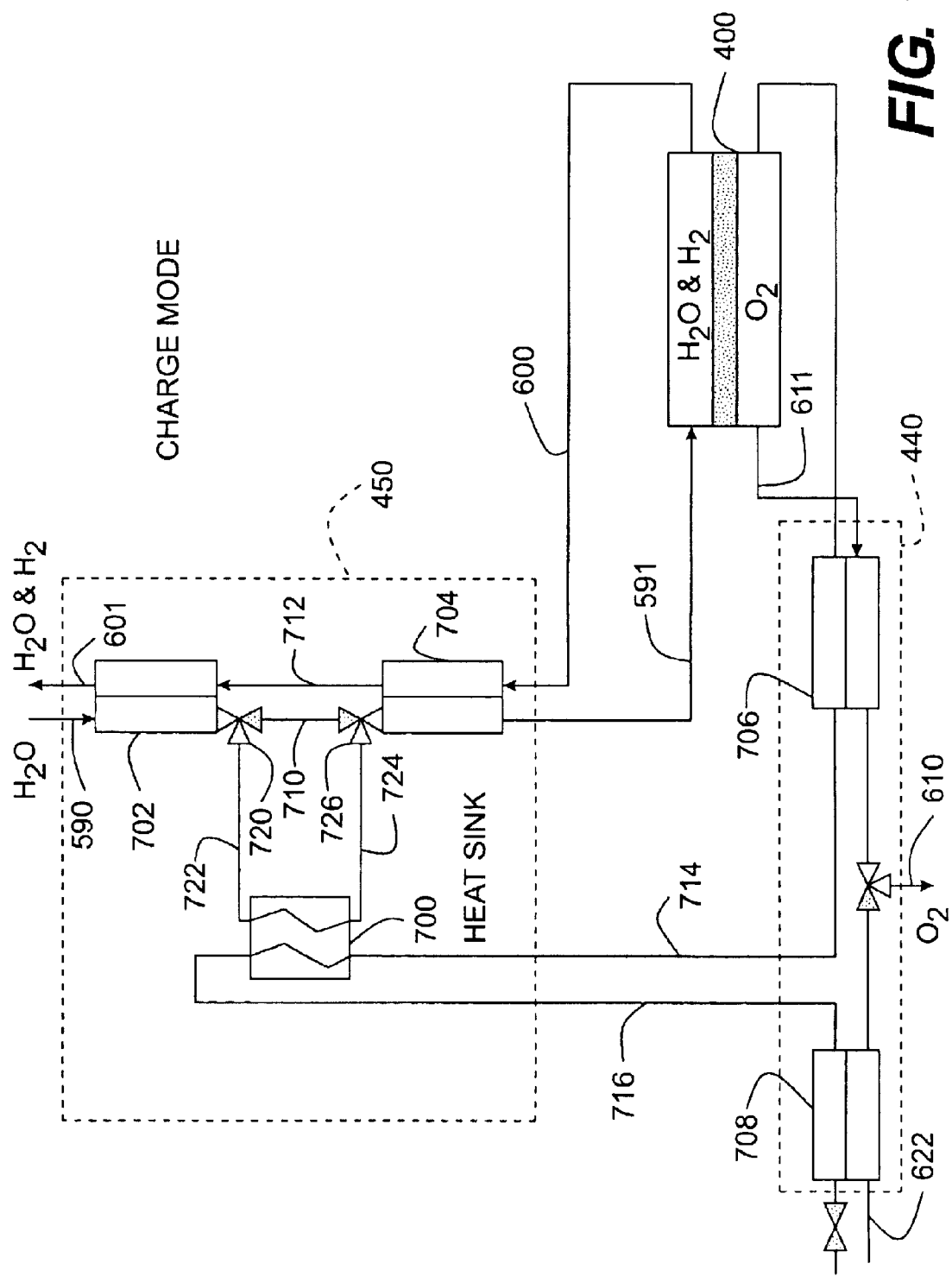

FIG. 10 illustrates the details of the heat sink/heat source section 450 and the heat exchanger section 440 in charge or electrolyzer mode shown as black boxes in FIG. 8. Liquid water from water tank 260 enters heat exchanger 702 through line 590. Preferably, water is heated to below 100° C., such as to 80–90° C., in heat exchanger 702. A three way valve 720 is open to allow the water to enter the heat sink/heat source 700 area through line 722. Heat sink/heat source 700 acts as a heat source in charge mode. The heat stored in the heat source 700 is preferably used to heat the liquid water to above its boiling point. However, if desired, heat source 700 can be used to raise the temperature of water vapor in addition.

The water is heated by several different methods described above. One method is allowing carbon dioxide to be adsorbed in the zeolite and releasing heat to the water passing near or in thermal contact with the zeolite bed. Another method is passing the water near or in thermal contact to the hydrogen storage tank 250, which releases heat to the water due to absorption of hydrogen in the metal hydride located in tank 250 during charge mode. A third method is passing the water near or in thermal contact to the high heat of fusion material storage tank.

The water vapor exits the heat source 700 area through line 724 and enters optional heat exchanger 704 through open valve 726. The water vapor then enters SORFC 400 through line 591 and is electrolyzed therein. Some water vapor and hydrogen return to heat exchangers 704, 702 from SORFC through line 600 where they heat the incoming water. The water vapor is cooled to liquid water in the heat exchangers 704, 702 and exists region 450 through line 601. The oxygen generated in the SORFC 400 during electrolyzation exists the system through line 610.

FIGS. 9 and 10 illustrate preferred embodiments where the heat sink/heat source 700 is heated by the depleted oxidizer outflow in the discharge or fuel cell mode. However, the heat sink/heat source 700 may be heated in the discharge mode by other sources instead of or in addition to the depleted oxidizer outflow. For example, the heat sink/heat source 700 may be located in close proximity or in thermal contact with the fuel cell stack, and receive heat directly from the fuel cell stack. The heat sink/heat source 700 may also be heated by the depleted fuel flow. Any one, two or three of the above methods may be used to heat the heat sink/heat source 700 in the discharge mode.

Figure 11:
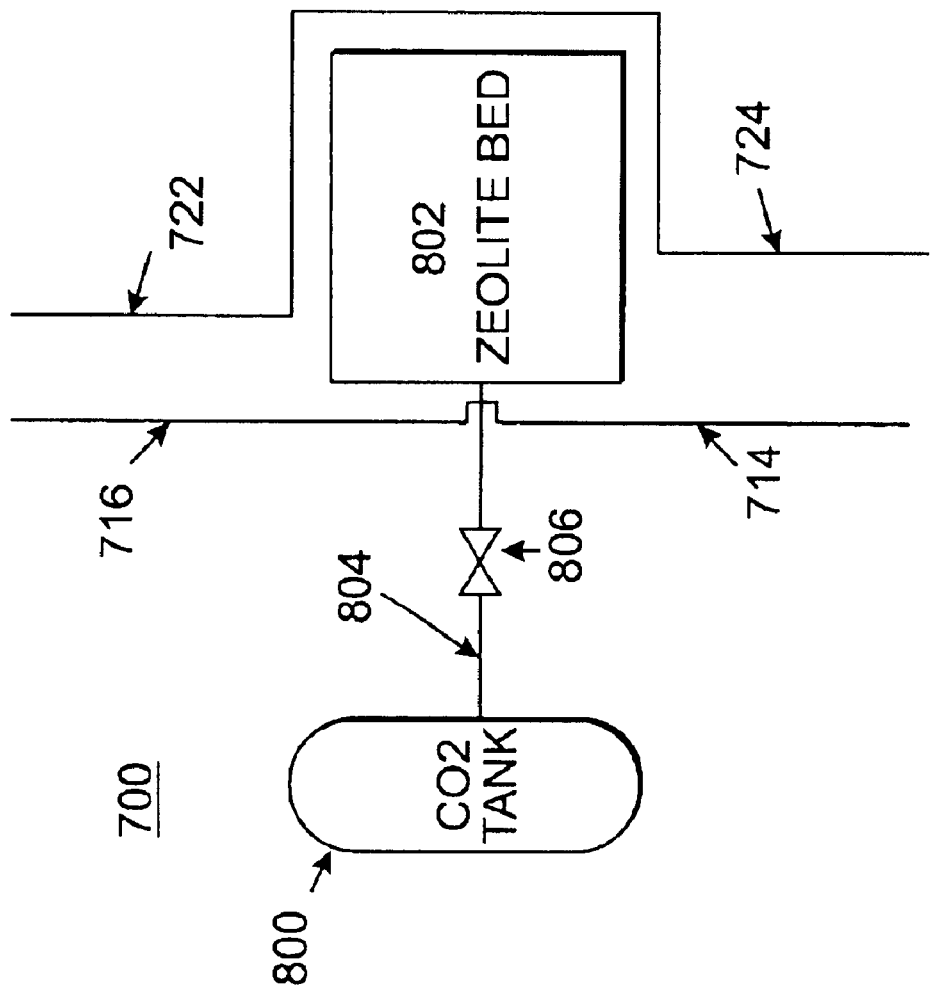
FIGS. 11 and 12 are schematics of parts of the SORFC system.

FIG. 11 illustrates the details of the heat sink/heat source 700 for the gas adsorption/desorption embodiment. The heat sink/heat source 700 includes a gas tank 800, such as a $CO_2$ gas tank, connected to an adsorbent material bed 802, such as a zeolite bed, by line 804 and valve 806. During discharge mode, the gas is desorbed from bed 802 to tank 800 by the waste heat provided from depleted air passing through line 714/716 near, passing through or in thermal contact with the bed 802. During charge mode, the gas is adsorbed into the bed 802 from tank 800 and releases heat to line 722/724 to heat water passing through this line. Line 722/724 is located near, passing through or in thermal contact with the bed 802.

If hydrogen absorption is used to store heat, then tank 800 and bed 802 are replaced with the hydrogen storage tank 250, and line 722/724 passes near or in thermal contact with the tank 250. If high heat of fusion material is used to store heat, then tank 800 and bed 802 are replaced with a high heat of fusion material storage tank and line 722/724 passes near or in thermal contact with this tank.

In another preferred embodiment of the present invention, the fuel cell system utilizes a plurality of heat sink/heat sources. Preferably, the heat sink/heat sources are arranged in series with the fuel and/or oxidizer inflow and/or outflow streams. However, if desired, the heat sink/heat sources may be arranged in parallel in case the fuel and/or oxidizer inflow and/or outflow streams are split into a plurality of parallel streams. Preferably, the plurality of heat sink/heat sources comprise a plurality of phase change materials. More preferably, the plurality of heat sink/heat sources comprise a plurality of phase change materials having a different phase change temperature. Most preferably, the phase change material(s) with the lower phase change temperature are located farther downstream along the fuel and oxidizer outflow from the fuel cell stack than material(s) with higher phase change temperatures. However, if desired, the heat sink/heat sources may comprise the above described gas desoprtion heat storage materials rather than the phase change materials.

Figure 12:
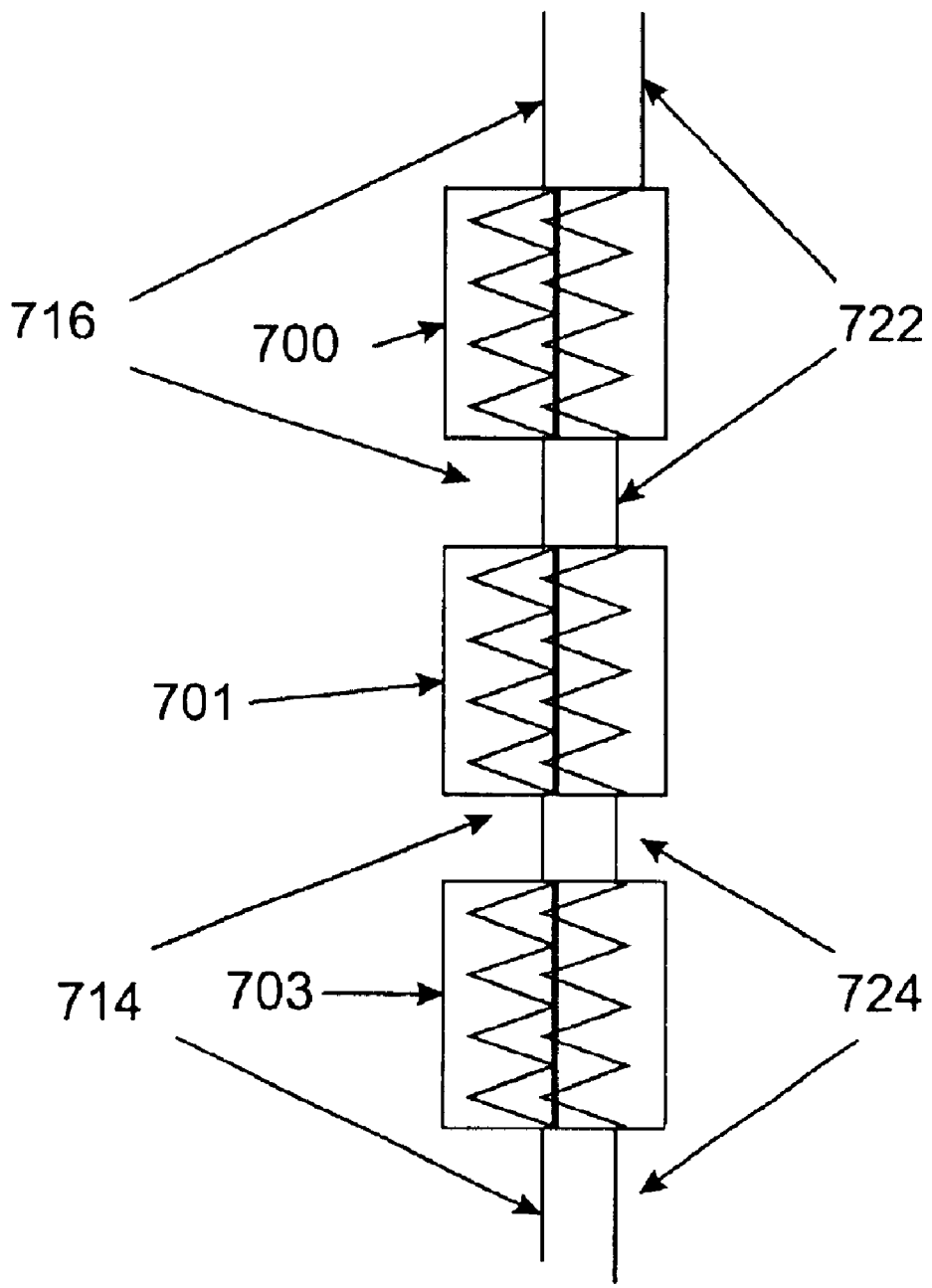

FIG. 12 illustrates a preferred system containing a plurality of heat sink/heat sources each comprising a different phase change material. As shown in FIG. 12, three heat sink/heat sources 700, 701 and 703 are arranged in series with the fuel and oxidizer inflow and outflow from the fuel cell stack 400. However, two or more than three heat sink/heat sources may be used. Heat sink/heat source 700 is located farthest downstream along the oxidizer outflow path and heat sink/heat source 703 is located closest downstream along the oxidizer outflow path from the fuel cell stack 400. In contrast, the heat sink/heat source 700 is located closest upstream along the fuel inflow path and heat sink/heat source 703 is located farthest upstream along the fuel inflow path to the fuel cell stack 400.

Preferably, the heat sink/heat source 700 has the lowest phase change temperature, preferably about 110 to about 300° C., optional heat sink/heat source 701 has an intermediate phase change temperature, preferably about 300 to about 600° C., and heat sink/heat source 703 has the highest phase change temperature, preferably about 600 to about 1000° C. Of course, there may be two or more than three heat sink/heat sources. For example, the heat sink/heat sources 700 and/or 701 may comprise a phase change material having a relatively higher specific heat of latent fusion with a relatively low phase change temperature, such as LiOH or LiH, while the heat sink/heat source 703 may comprise a material with a phase change temperature within 50 to 100 degrees of the fuel cell operating temperature, but with a relatively lower specific heat of latent fusion, such as LiF. However, any suitable combination of materials listed in Table I may be used.

During the discharge or fuel cell mode, the hot oxidizer outflow is maintained at a temperature that varies by less than about 50 to 100 degrees from the fuel cell operating temperature. The hot oxidizer outflow is used to heat the heat sink/heat source 703, which preferably has a phase change temperature within about 100 degrees of the fuel cell operating temperature. For example, the phase change material in the heat sink/heat source 703 may have a phase change temperature of about 800 to about 900° C. when the fuel cell operates at about 900° C.

After the oxidizer outflow temperature is reduced by transferring heat to the heat sink/heat source 703, the medium temperature oxidizer is used to heat the second heat sink/heat source 701. Preferably, the heat sink/heat source 701 has a phase change temperature that is less than the temperature of the medium temperature oxidizer, such as within about 100 degrees below the temperature of the medium temperature oxidizer.

After the oxidizer outflow temperature is reduced by transferring heat to the heat sink/heat source 701, the low temperature oxidizer is used to heat the third heat sink/heat source 700. Preferably, the heat sink/heat source 700 has a phase change temperature that is less than the temperature of the low temperature oxidizer, such as within about 100 degrees below the temperature of the low temperature oxidizer.

When the fuel cell operates in the charge or electrolysis mode, the water is first vaporized by heat from the heat sink/heat source 700 by passing through or adjacent to the heat sink/heat source 700. The vaporized water (i.e., water vapor) is then heated to an intermediate temperature, such as 300 to 700° C., by the heat sink/heat source 701, by passing through or adjacent to the heat sink/heat source 701. The heated water vapor is then heated to near the fuel cell operating temperature, such as within 10 to 100° C. of the operating temperature, by the heat sink/heat source 703, by passing through or adjacent to the heat sink/heat source 703.

If desired, heat sink/heat source 700 may contain a larger amount of phase change material than the heat sink/heat source 703, since it may take a larger amount of phase change material to vaporize water than to heat water vapor to a higher temperature. Furthermore, if desired, the heat sink/heat sources 700, 701 and 703 may be heated by the fuel outflow in addition to or instead of the oxidizer outflow in the fuel cell mode, and may be used to heat the fuel inflow in addition to or instead of the water inflow.

The preferred embodiments described above include the use of hydrogen as a fuel in the fuel cell mode and formation of hydrogen and oxygen from water in the electrolysis mode. However, in another preferred embodiment, a carbon and hydrogen containing fuel may be used in the fuel cell mode and/or a hydrocarbon gas may be formed in an electrolysis mode. Carbon and hydrogen containing fuel includes hydrocarbon fuels, such as methane, natural gas which contains methane with hydrogen and other gases, propane or other biogas, synthetic diesel, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

Figure 13:
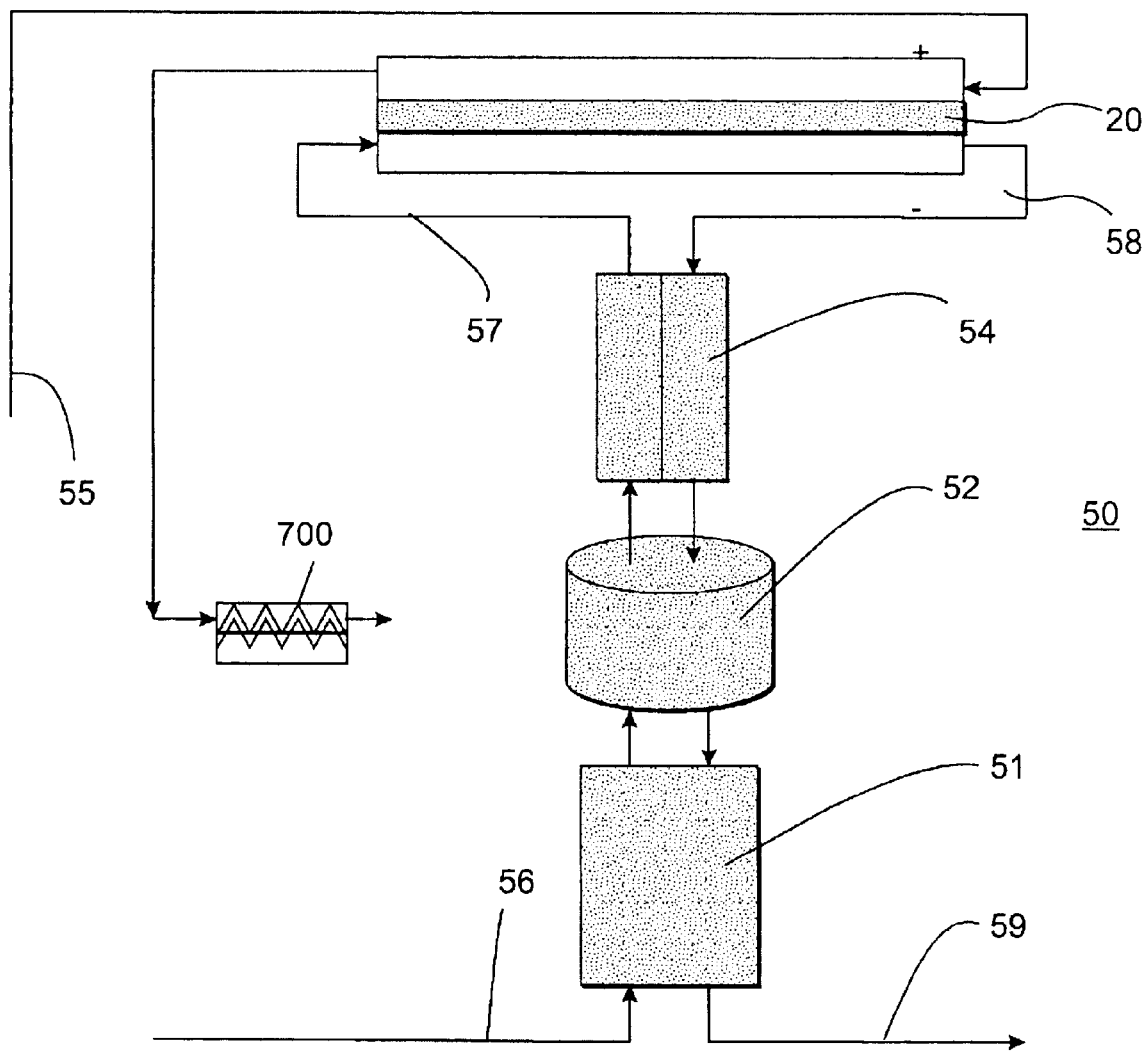

A preferred SORFC system 50 which uses a carbon and hydrogen containing fuel operating in a fuel cell mode is shown of FIG. 13 as a simplified schematic. A single SORFC 20 previously shown as SORFC 400 in FIG. 1 operating in the fuel cell mode is shown again in FIG. 13. While a single SORFC is shown, it should be understood that the system 50 contains a plurality of SORFC stacks. A hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

An enthalpy recovery unit 52 transfers water vapor from first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. A heat exchanger 54 is a counter flow gas—gas heat exchanger. The SORFC power output, such as output electrode(s), is connected to a power distribution system. The oxidizer (i.e., oxygen or air) enters the system 50 through the oxidizer inlet or conduit 55, while the fuel enters the system through the fuel inlet or conduit arrangement 56/57. The oxidizer exits through one or more of the heat sink/heat sources 700, described above. The fuel exhaust exits through conduit arrangement 58/59.

A method of operating the system 50 in the fuel cell mode is now described. Within the SORFC system 50 shown in FIG. 13, oxidizer, such as pure oxygen reactant gas from an oxygen storage vessel, such as a liquid oxygen tank, or air, is delivered to the cathode chamber of SORFC 20 through inlet conduit 55. The hot oxidizer outflow is passed through one or more of the of the heat sink/heat sources 700 and heats the heat sink/heat sources 700 for heat storage.

High purity carbon and hydrogen inlet stream, such as a hydrocarbon stream, preferably a methane stream, is introduced into the SORFC system 50 from a hydrocarbon storage vessel, such as a tank (not shown for clarity), through conduit 56 into the hydrogen recovery unit 51. Within the hydrogen recovery unit 51, hydrogen gas is transferred from the fuel exhaust outlet stream in conduit 58 into the methane stream. This hydrogen supports a uniform methane reformation process within the anode chamber of SORFC 20. The methane and hydrogen mixture next is introduced into the enthalpy recovery unit 52, where a portion of the water vapor is transferred from the fuel exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600C to 1000C using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel exhaust) in conduit 58 to carbon dioxide, additional water vapor, and excess hydrogen. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen recovery unit 51 where virtually all but trace quantities of the hydrogen is transferred to the inlet methane stream. Using the preferred electrochemical proton exchange process as the hydrogen recovery unit 51, provides an exact measure of the hydrogen content within the discharged gas mixture in conduit 58 which is used to adjust the input methane flow rate. The outlet mixture in conduit 59 from hydrogen recovery unit 51 contains only carbon dioxide and water which are stored separately (not shown).

Figure 14:
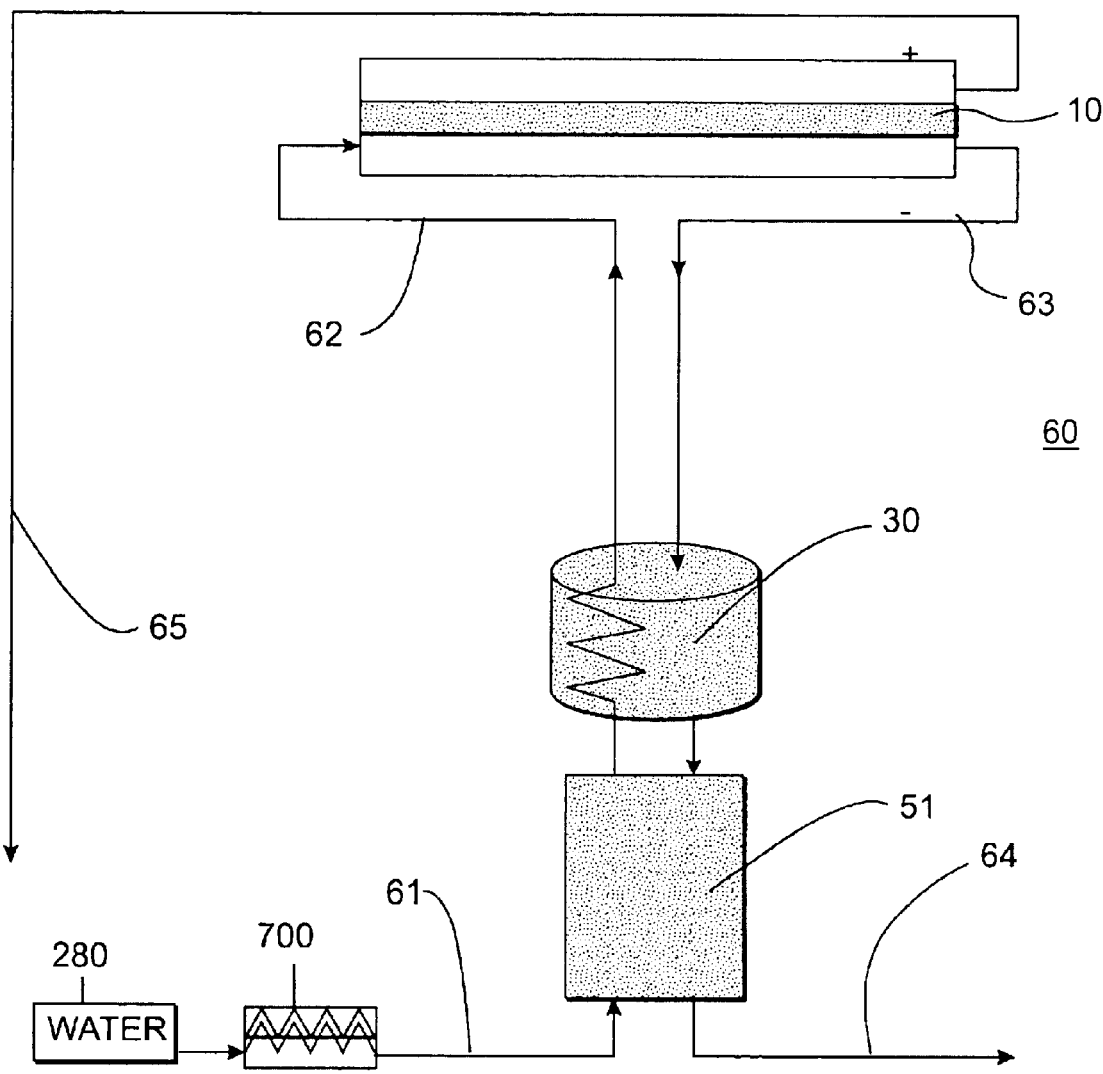

The SORFC system 60 of a preferred embodiment operating in an electrolysis mode is shown of FIG. 14 as a simplified schematic. A single SORFC 10 previously shown in FIG. 2 as a cross section 400 operating in the electrolysis mode is shown again in FIG. 14. The hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

Figure 15:
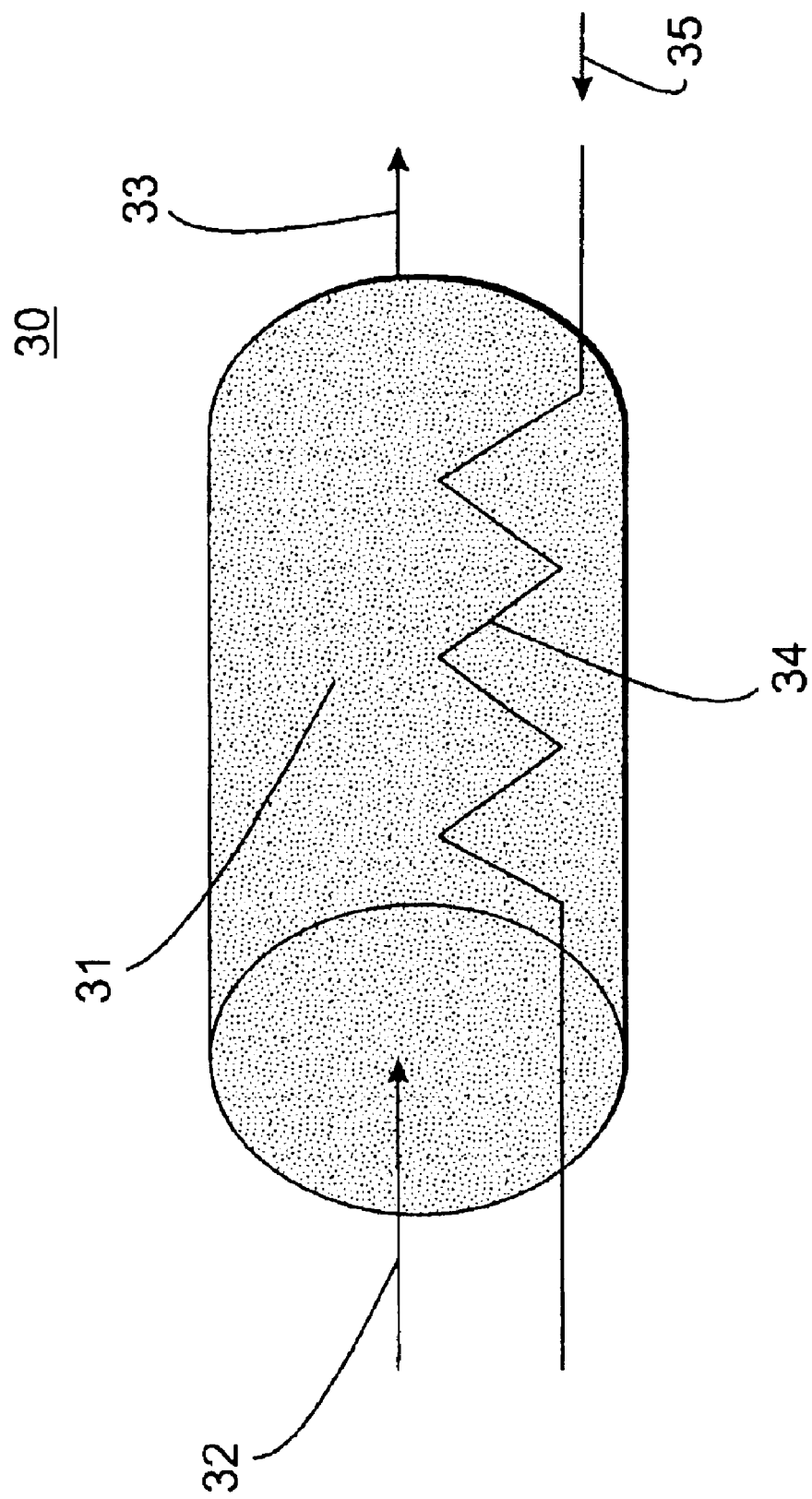
FIG. 15 is a schematic of a Sabatier reactor subsystem.

The Sabatier reactor subsystem 30, described with respect to FIGS. 14 and 15, converts carbon monoxide and hydrogen into methane and water vapor. A Sabatier reactor subsystem 30 includes a reactor tube 31 which contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon dioxide discharge mixture 32 is provided from the SORFC into the Sabatier reactor 30.

Because the reaction within reactor tube 31 is highly exothermic, a heat exchanger 34 located in or adjacent to tube 31 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 35 is heated in the Sabatier reactor by the reaction of the outlet or discharge mixture 32. The water vapor and carbon dioxide inlet mixture 35 is then provided from the Sabatier reactor into the SORFC 10.

Carbon dioxide and water enter the system 60 through inlet or conduit 61, which may be the same or different than conduit 56, shown in FIG. 13. The water is heated and/or vaporized in one or more heat sink/heat source(s) 700. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 13. If desired, one or more heat sink/heat sources 700 may be positioned to preheat the carbon dioxide as well as the water in conduit 61 at any point in the flow stream, such as before the hydrogen recovery unit 51, between the hydrogen recovery unit 51 and the Sabatier reactor subsystem 30, and/or after the Sabatier reactor subsystem 30.

Thus, the system 60 operating in the electrolysis mode is the same system as system 50 operating in the fuel cell mode, except that the inlet and outlet streams are steered through the Sabatier reactor subsystem 30 instead of through the heat exchanger 54 and the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50.

A method of operating the system 60 in the electrolysis mode is now described. Carbon dioxide and water are introduced into the SORFC system 60 through conduit 61 into hydrogen recovery unit 51. Carbon dioxide may be introduced from a carbon dioxide storage vessel or from a conduit. The water is vaporized and/or the water vapor is further heated by one or more heat sinks/heat sources 700. Within the hydrogen recovery unit 51, hydrogen gas is transferred from the outlet stream in conduit 63 into the carbon dioxide and water inlet stream. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through the Sabatier subsystem 30 to convert all the carbon oxides to methane and water with the excess hydrogen. The discharged gas mixture in conduit 63 is then directed to the hydrogen recovery unit 51 wherein virtually all but trace quantities of the hydrogen is transferred to the inlet carbon dioxide and water stream. Using the preferred electrochemical proton exchange process as the hydrogen recovery unit 51, provides an exact measure of the hydrogen content within the discharged gas mixture in conduit 63 which is used to adjust the input carbon dioxide flow rate. The outlet mixture in conduit 64 from hydrogen recovery unit 51 contains only methane and water which are stored separately (not shown).

In the meantime, pure oxygen gas is generated in the SORFC 10 anode during the electrolysis process. The oxygen is discharged from the SORFC 10 anode through conduit 65 and on to discharge, direct metabolic use and/or to liquefied storage (not shown).

The Sabatier reactor which generates methane is advantageous because it operates at a temperature of about 900 degrees, which is a suitable temperature for heating the inlet stream being provided into the SORFC to or near to a desired SORFC operating temperature. However, other reactors which generate hydrocarbon gases other than methane may be used instead of the Sabatier reactor. For example, reactors which convert an exhaust gas which contains hydrogen and carbon oxides, such as carbon monoxide and/or carbon dioxide, and optionally water, to methanol may be used instead. The methanol reactors typically, but not necessarily, contain a copper catalyst which converts hydrogen, carbon oxides and/or water vapor to methanol. These reactors may be catalyst bed type reactors, such as ARC reactors, quench converters, tube cooled converters, isothermal reactors where a continuous catalyst bed surrounds a spiral wound heat exchanger, and other suitable reactor types.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings are not necessarily to scale and illustrate the device in schematic block format. The drawings and description of the preferred embodiments were chosen in order to explain the principles of the invention and its practical application, and are not meant to be limiting on the scope of the claims. It is intended that the scope of the invention be defined by the claims appended hereto, and their equivalents.

We claim:

1. A fuel cell system, comprising:
   a regenerative fuel cell; and
   a heat storage material which is adapted to store waste heat from the fuel cell during discharge mode and which is adapted to heat water provided into the fuel cell for electrolyzation during charge mode, wherein the heat storage material melts to store heat or desorbs a gas to store heat.

2. The system of claim 1, wherein the fuel cell comprises a SORFC and the material is adapted to vaporize liquid water during the charge mode.

3. The system of claim 2, wherein the material comprises a gas adsorption material which releases heat upon adsorption of the gas.

4. The system of claim 3, wherein the material comprises a zeolite bed and the gas comprises pressurized $CO_2$ stored in a tank connected to the zeolite bed.

5. The system of claim 2, wherein the material comprises a hydrogen storage material which is adapted to absorb hydrogen fuel and release heat during the charge mode.

6. The system of claim 5, wherein the material is adapted to desorb hydrogen fuel towards the fuel cell upon application of waste heat from the fuel cell during the discharge mode.

7. The system of claim 6, wherein the material comprises a metal hydride.

8. The system of claim 7, wherein the material comprises magnesium hydride.

9. The system of claim 2, wherein the material comprises a first high heat of fusion material which melts in discharge mode to store heat and which solidifies during charge mode to release heat.

10. The system of claim 9, wherein the material comprises aluminum chloride or sodium chlorate.

11. The system of claim 9, further comprising a second high heat of fusion material which melts in discharge mode to store heat and which solidifies during charge mode to release heat, wherein the second high heat of fusion material phase change temperature is lower than the fuel cell operating temperature by about 100° C. or less.

12. The system of claim 11, wherein:
   the second high heat of fusion material has a higher phase change temperature than the first high heat of fusion material; and
   second high heat of fusion material is adapted to heat water vaporized by the first high heat of fusion material to within about 100° C. of the fuel cell operating temperature.

13. The system of claim 12, wherein the first material comprises LiH or LiOH and the second material comprises LiF.

14. The system of claim 12, further comprising a third high heat of fusion material which melts in discharge mode to store heat and which solidifies during charge mode to release heat, wherein the third high heat of fusion material phase change temperature is lower than the phase change temperature of the second high heat of fusion material but higher than the phase change temperature of the first high heat of fusion material.

15. The system of claim 2, further comprising a carbon dioxide source which is adapted to provide carbon dioxide to the fuel cell during the charge mode.

16. The system of claim 1, further comprising a conduit which connects oxidizer outflow from the fuel cell operating in the discharge mode to the heat storage material such that the oxidizer outflow of the fuel cell operating in the discharge mode is adapted to heat the heat storage material.

17. A method of operating a regenerative fuel cell system, comprising:
   providing a fuel and an oxidizer into a fuel cell during discharge mode;
   storing waste heat generated by the fuel cell during the discharge mode in a heat storage material which melts to store heat or desorbs a gas to store heat;
   heating water using the stored waste heat during charge mode; and
   electrolyzing the heated water in the fuel cell during the charge mode.

18. The method of claim 17, wherein:
   the fuel cell comprises a SORFC; and
   heating water comprises vaporizing liquid water using the stored heat.

19. The method of claim 18, wherein the material comprises a gas adsorption material which releases heat upon adsorption of a gas.

20. The method of claim 19, wherein the material comprises a zeolite bed and the gas comprises pressurized $CO_2$ stored in a tank connected to the zeolite bed.

21. The method of claim 18, wherein the material comprises a hydrogen storage material which absorbs hydrogen fuel from the fuel cell and releases heat during charge mode.

22. The method of claim 21, wherein the material desorbs hydrogen fuel towards the fuel cell upon application of waste heat from the fuel cell during discharge mode.

23. The method of claim 22, wherein the material comprises a metal hydride located in a hydrogen fuel storage tank.

24. The method of claim 23, wherein the material comprises magnesium hydride.

25. The method of claim 18, wherein the material comprises a first high heat of fusion material which melts in discharge mode to store heat and which solidifies during charge mode to release heat.

26. The method of claim 25, wherein the first material comprises aluminum chloride or sodium chlorate.

27. The method claim 25, further comprising:
   storing waste heat generated by the fuel cell during the discharge mode in a second high heat of fusion material which melts in discharge mode to store heat and which solidifies during charge mode to release heat; and
   heating water vaporized by the first high heat of fusion material using the second high heat of fusion material.

28. The method of claim 27, wherein:
   the second high heat of fusion material phase change temperature is lower than the fuel cell operating temperature by about 100° C. or less;
   the second high heat of fusion material has a higher phase change temperature than the first high heat of fusion material; and
   the second high heat of fusion material heats water vaporized by the first high heat of fusion material to within about 100° C. of the fuel cell operating temperature.

29. The method of claim 28, wherein the first material comprises LiH or LiOH and the second material comprises LiF.

30. The method of claim 28, further comprising:
storing waste heat generated by the fuel cell during the discharge mode in a third high heat of fusion material which melts in discharge mode to store heat and which solidifies during charge mode to release heat; and
heating water vaporized by the first high heat of fusion material using the third high heat of fusion material.

31. The method of claim 17, further comprising providing carbon dioxide to the fuel cell during the charge mode.

32. The method of claim 17, wherein the step of storing waste heat comprises heating the heat storage material using oxidizer outflow from the fuel cell operating in the discharge mode.

33. A fuel cell system, comprising:
a SORFC; and
a first means for storing waste heat from the SORFC during discharge mode and for heating water provided into the SORFC for electrolyzation during charge mode.

34. The system of claim 33, further comprises a second means for storing waste heat from the SORFC during discharge mode and for vaporizing water provided into the SORFC for electrolyzation during charge mode.

35. A fuel cell system, comprising:
a regenerative fuel cell;
a first heat storage material which is adapted to store waste heat from the fuel cell during discharge mode and which is adapted to vaporize water provided into the fuel cell for electrolyzation during charge mode; and
a second heat storage material which is adapted to store waste heat from the fuel cell during discharge mode and which is adapted to heat the vaporized water provided into the fuel cell for electrolyzation during the charge mode.

36. The system of claim 35, wherein:
the fuel cell comprises a SORFC;
the first heat storage material comprises a first high heat of fusion material which melts in discharge mode to store heat and which solidifies during charge mode to release heat;
the second heat storage material comprises a second high heat of fusion material which melts in discharge mode to store heat and which solidifies during charge mode to release heat; and
a phase change temperature of the first high heat of fusion material is lower than a phase change temperature of the second high heat of fusion material.

37. The system of claim 36, wherein:
the second high heat of fusion material phase change temperature is lower than the fuel cell operating temperature by about 100° C. or less;
second high heat of fusion material is adapted to heat water vaporized by the first high heat of fusion material to within about 100° C. of the fuel cell operating temperature;
the first high heat of fusion material comprises LiH or LiOH; and
the second high heat of fusion material comprises LiF.

38. The system of claim 36, further comprising a third high heat of fusion material which melts in discharge mode to store heat and which solidifies during charge mode to release heat, wherein the third high heat of fusion material phase change temperature is lower than the phase change temperature of the second high heat of fusion material but higher than the phase change temperature of the first high heat of fusion material.

39. A method of operating a regenerative fuel cell system, comprising:
providing a fuel and an oxidizer into a fuel cell during discharge mode;
storing waste heat generated by the fuel cell during the discharge mode in a first and in a second heat storage materials;
vaporizing water using the waste heat stored in the first heat storage material;
heating the vaporized water using the waste heat stored in the second heat storage material; and
electrolyzing the heated water in the fuel cell during a charge mode.

40. The method of claim 39, wherein the first and the second heat storage materials comprise a high heat of fusion materials which melt in discharge mode to store heat and which solidify during charge mode to release heat.

41. The method of claim 40, wherein:
the second high heat of fusion material phase change temperature is lower than the fuel cell operating temperature by about 100° C. or less;
the second high heat of fusion material has a higher phase change temperature than the first high heat of fusion material;
the second high heat of fusion material heats water vaporized by the first high heat of fusion material to within about 100° C. of the fuel cell operating temperature;
the first high heat of fusion material comprises LiH or LiOH; and
the second high heat of fusion material comprises LiF.

42. The method of claim 40, further comprising:
storing waste heat generated by the fuel cell during the discharge mode in a third high heat of fusion material which melts in discharge mode to store heat and which solidifies during charge mode to release heat; and
heating water vaporized by the first high heat of fusion material using the third high heat of fusion material.

43. A fuel cell system, comprising:
a regenerative fuel cell;
a heat storage material which is adapted to store waste heat from the fuel cell during discharge mode and which is adapted to heat water provided into the fuel cell for electrolyzation during charge mode; and
a conduit which connects oxidizer outflow from the fuel cell operating in the discharge mode to the heat storage material such that the oxidizer outflow of the fuel cell operating in the discharge mode is adapted to heat the heat storage material.

44. The system of claim 43, wherein the heat storage desorbs a gas to store heat.

45. The system of claim 43, wherein the heat storage material comprises a high heat of fusion material which melts in discharge mode to store heat and which solidifies during charge mode to release heat.

46. A method of operating a regenerative fuel cell system, comprising:
providing a fuel and an oxidizer into a fuel cell during discharge mode;

heating a heat storage material using oxidizer outflow from the fuel cell operating in the discharge mode to store waste heat generated by the fuel cell during the discharge mode;

heating water using the stored waste heat during charge mode; and electrolyzing the heated water in the fuel cell during the charge mode.

47. The method of claim 46, wherein the heat storage material desorbs a gas to store heat.

48. The method of claim 46, wherein the heat storage material comprises a high heat of fusion material which melts in discharge mode to store heat and which solidifies during charge mode to release heat.

* * * * *

UNITED STATES PATENT AND TRADEMARK OFFICE
CERTIFICATE OF CORRECTION

| | |
|---|---|
| PATENT NO. | : 6,821,663 B2 |
| APPLICATION NO. | : 10/635446 |
| DATED | : November 23, 2004 |
| INVENTOR(S) | : James McElroy et al. |

It is certified that error appears in the above-identified patent and that said Letters Patent is hereby corrected as shown below:

IN THE SPECIFICATION:

Column 1, line 6, please add:

-- STATEMENT REGARDING FEDERALLY SPONSORED RESEARCH OR DEVELOPMENT

The invention was made with Government support under grant number DE-FC26-03NT41854 awarded by the Department of Energy. The Government has certain rights in the invention. --

Signed and Sealed this

Seventeenth Day of June, 2008

JON W. DUDAS
*Director of the United States Patent and Trademark Office*